US011743809B2

(12) United States Patent
Singh

(10) Patent No.: US 11,743,809 B2
(45) Date of Patent: \*Aug. 29, 2023

(54) LTE NETWORK EXTENSION (LNE) SYSTEM, METHODS, AND APPARATUS

(71) Applicant: Charter Communications Operating, LLC, St. Louis, MO (US)

(72) Inventor: Lakhbir Singh, Aurora, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/857,138

(22) Filed: Jul. 4, 2022

(65) Prior Publication Data

US 2022/0338107 A1 Oct. 20, 2022

Related U.S. Application Data

(63) Continuation of application No. 16/922,933, filed on Jul. 7, 2020, now Pat. No. 11,382,026, which is a continuation of application No. 15/992,165, filed on May 29, 2018, now Pat. No. 10,708,855.

(51) Int. Cl.
| | |
|---|---|
| *H04W 48/16* | (2009.01) |
| *H04W 48/18* | (2009.01) |
| *H04W 48/02* | (2009.01) |
| *H04W 88/16* | (2009.01) |
| *H04W 8/26* | (2009.01) |

(52) U.S. Cl.
CPC ............ *H04W 48/16* (2013.01); *H04W 8/26* (2013.01); *H04W 48/02* (2013.01); *H04W 48/18* (2013.01); *H04W 88/16* (2013.01)

(58) Field of Classification Search
CPC ..... H04W 48/16; H04W 48/18; H04W 48/02; H04W 48/12; H04W 8/26; H04W 88/16; H04W 24/04; H04W 24/02
USPC .................................................. 370/329–330
See application file for complete search history.

(56) References Cited

U.S. PATENT DOCUMENTS

| | | | |
|---|---|---|---|
| 2013/0267229 A1* | 10/2013 | Gopalakrishnan | .......................... H04W 36/00835 455/436 |
| 2016/0105915 A1* | 4/2016 | Zhang | ................... H04W 16/14 370/329 |
| 2019/0141586 A1* | 5/2019 | Olsson | ................... H04W 8/26 |

(Continued)

*Primary Examiner* — Candal Elpenord
(74) *Attorney, Agent, or Firm* — Straub & Straub; Michael P. Straub; Stephen T. Straub

(57) ABSTRACT

An LTE network extension (LNE) system includes an LTE access gateway (LAG) and a provisioned database. A plurality of LTE access radios in the LNE system broadcast the same shared PLMN ID (sPLMN ID). The sPLMN ID corresponds to a plurality of service provider core networks, each with a different PLMN. The provisioned database includes information identifying which networks are allowed to use the LNE system and includes service provider network address information. An LTE access radio, transmitting the sPLMN ID detects an attach request from a UE, and forwards the attach request to the LAG, which decides if access is to be allowed, based on a service provider home network PLMN included in an IMSI in the attach request and information in the provisioned database. If access is allowed, the LAG serves as a proxy between the LTE access radio and the UE's service provider home network.

18 Claims, 21 Drawing Sheets

(56) References Cited

U.S. PATENT DOCUMENTS

2019/0335534 A1* 10/2019 Atari ................ H04M 15/66
2021/0136658 A1* 5/2021 Rönneke ............ H04W 48/06

* cited by examiner

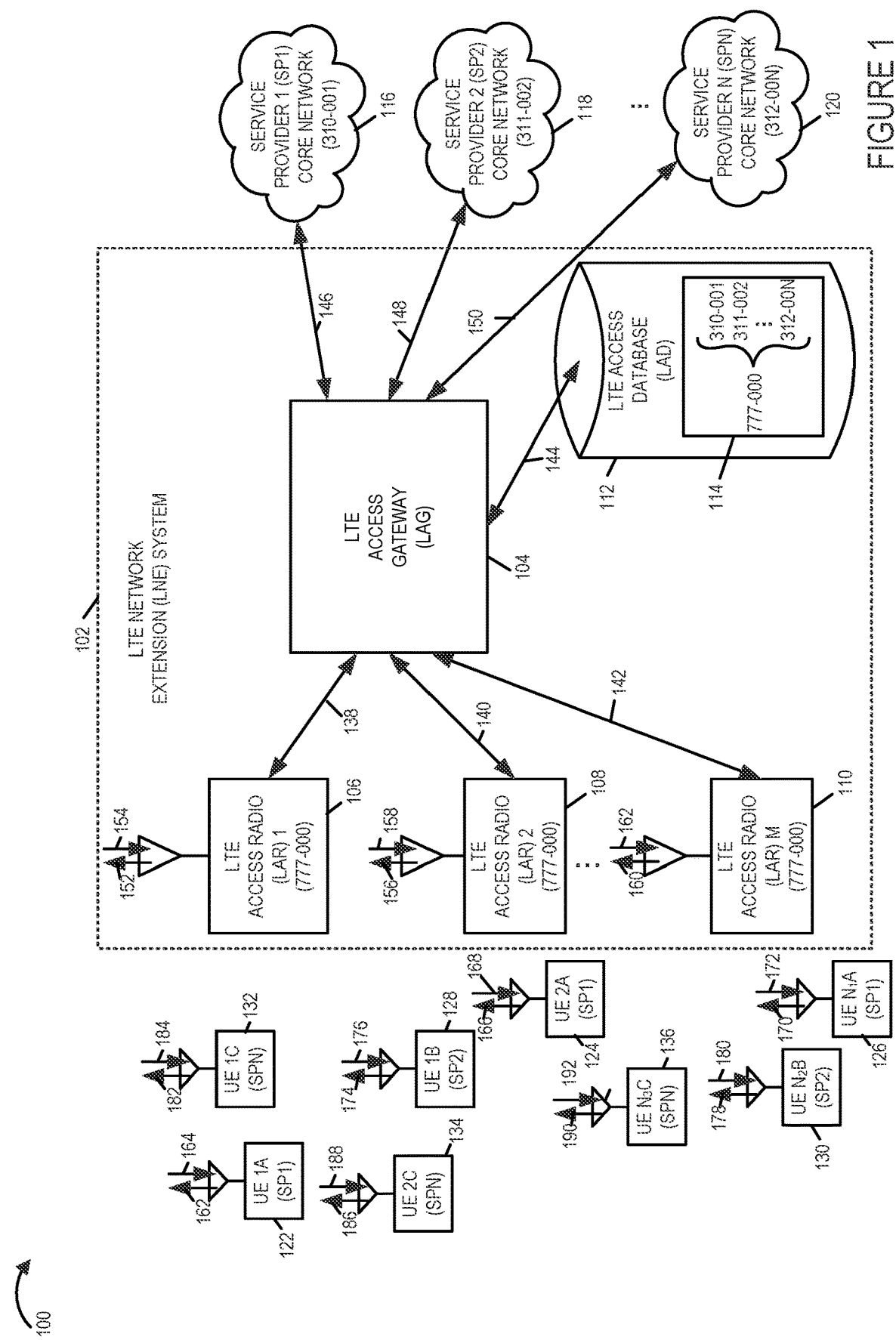

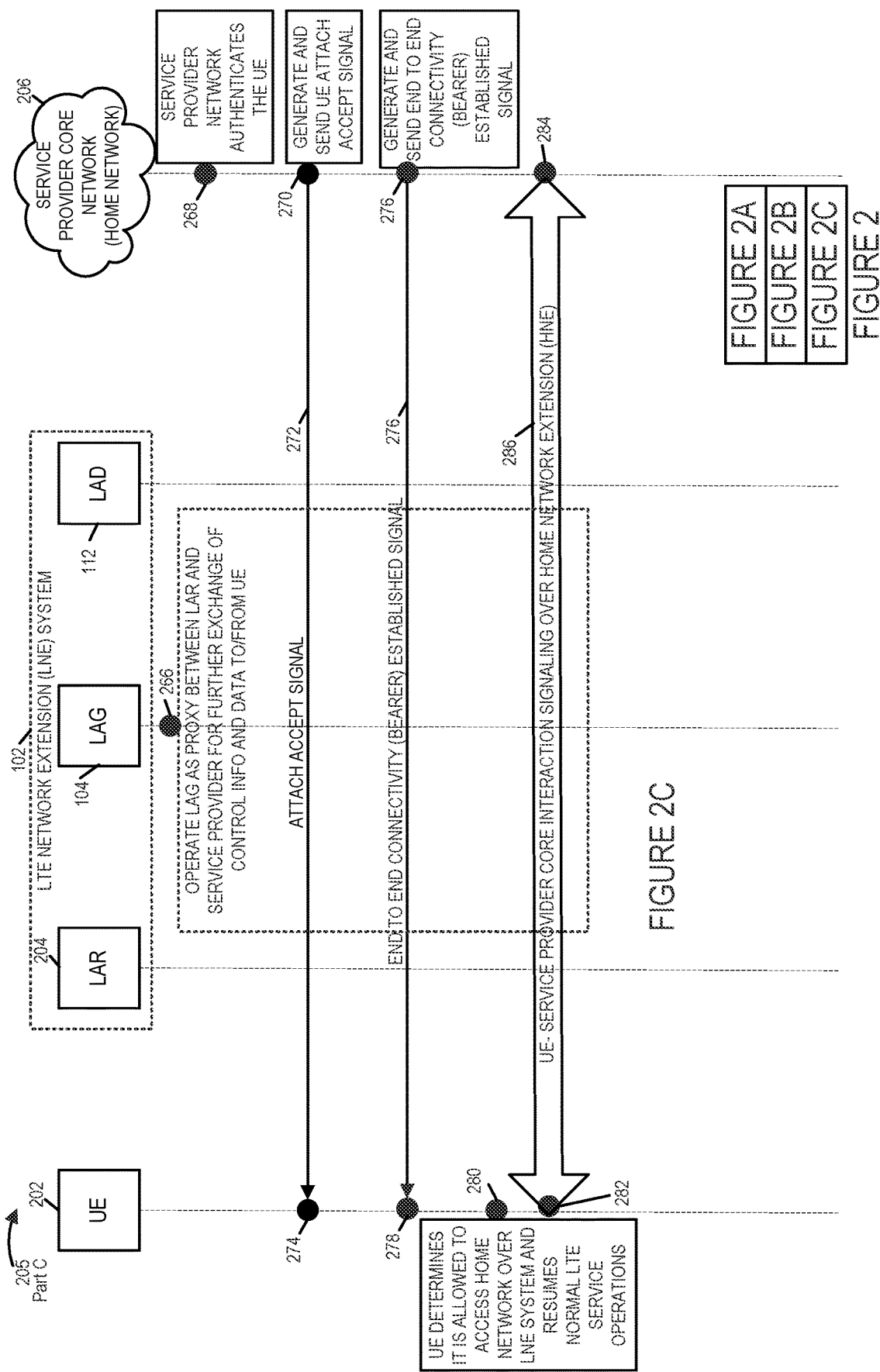

300

Example attach request from UE which is used by LAG to identify target PLMN (310-014)

PC Timestamp: [ 2018 Apl 9 13:01:33.591 ]

Unknown(0x0000)

Dir : DM Agent(UE) -> DM Host

PhoneType : LTE-GCT(GDM7243Q) Rev

CmdType : Log

Chip_Ver : 768

Command Code : 0xFFFF

LOG_ITEM Length : 56

Log Data Length : 40

Log Code : 0xB455

LocalSystemTime : 1980-01-05 20:24:34.560 (nMicroSec: 1474560000)

CellTime : sfn:0, tti:0, sampletime:0.00 us targetType : 5 direction : uplink

NAS Data Length : 35

Part A (301)

FIGURE 3A

Part B (303)

ATTACH_REQUEST:

SecurityHeaderType: 0

EPSAttachType: 1 (EPS attach)

NASKeySetIdentifier:

TSC: 0 (native security context)

NASKeySetId: 7

EPSMobileIdentity:

IMSI:

IdentityDigit:

Part C (305)

11: 5

12: 4

13: 1

14: 3

15: 6

UENetworkCapability:

octet3:

EEA0: 1 p128_EEA1: 1 p128_EEA2: 1 p128_EEA3: 1

EEA4: 0

EEA5: 0

EEA6: 0

EEA7: 0 octet4:

EIA0: 1 p128_EIA1: 1 p128_EIA2: 1 p128_EIA3: 1

FIGURE 3C

Part D (307)

EIA4: 0

EIA5: 0

EIA6: 0

EIA7: 0 octet5:

UEA0: 0

UEA1: 0

UEA2: 0

UEA3: 0

UEA4: 0

UEA5: 0

UEA6: 0

UEA7: 0 octet6:

UCS2: 0

UIA1: 0

UIA2: 0

UIA3: 0

UIA4: 0

UIA5: 0

FIGURE 3D

Part E (309)

UIA6: 0

UIA7: 0 octet7:

ProSedd: 0

ProSe: 0

H245ASH: 0

ACCCSFB: 0

LPP: 0

LCS: 0 p1xSR_VCC: 0

NF: 0

ESMMessageContainer:

NasMessageUpData: 0x0201D011D1270780000A00000D00

[Nas Message Data] :

PDN_CONNECTIVITY_REQUEST:

EPSBearerIdentity: 0

ProcedureTransactionIdentity: 1

RequestType: 1 (initial attach)

PDNType: 1 (IPv4)

FIGURE 3E

Part F (3011)

ESMInformationTransferFlag: 1 (security protected ESM information transfer required)

ProtocolConfigurationOptions:

ConfigurationProtocol: 0

ProtocolCfgs: empty

ContainerCfgs:

01:

ContainerId: 10 (IP address allocation via NAS signalling)

Length: 0

Contents:

02:

ContainerId: 13 (DNS Server IPv4 Address Request)

Length: 0

Contents:

MSnetworkfeaturesupport: 0x01

L3 Data in Hex :

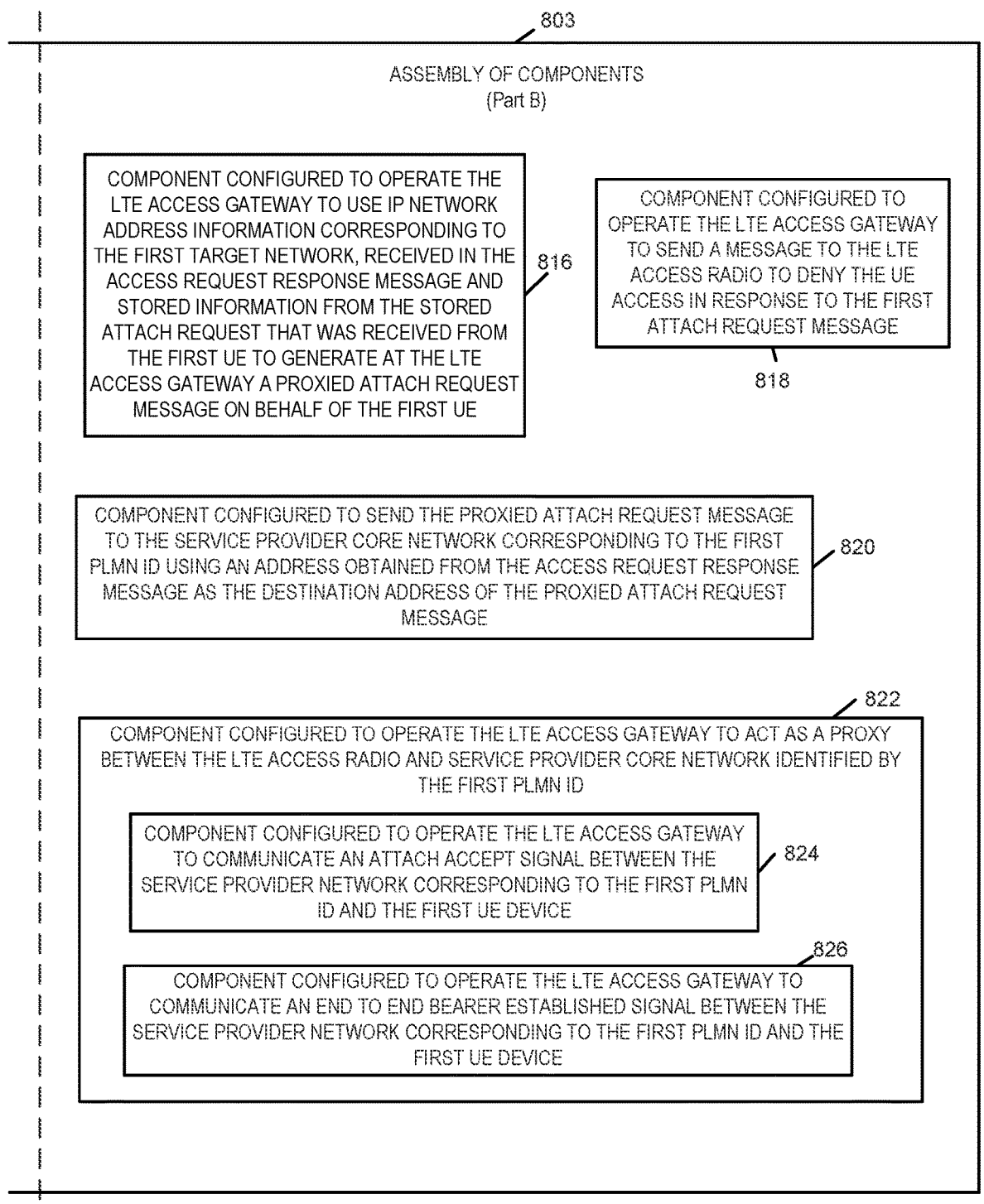

ns systems.

LTE NETWORK EXTENSION (LNE) SYSTEM, METHODS, AND APPARATUS

RELATED APPLICATIONS

The present application is a continuation of U.S. patent application Ser. No. 16/922,933 filed Jul. 7, 2020 which published as U.S. patent publication US 2020-0336978 A1 on Oct. 22, 2020, which is a continuation of U.S. patent application Ser. No. 15/992,165 filed May 29, 2018 and which published as U.S. Patent Publication No. US-2019-0373535-A1 on Dec. 5, 2019 and which issued as U.S. Pat. No. 10,708,855 on Jul. 7, 2020 with each of the preceding patent applications and publications being hereby expressly incorporated by reference in their entirety.

FIELD

The present application relates to wireless communications methods and apparatus, and more particularly, to methods and apparatus for extending coverage in LTE communications systems.

BACKGROUND

Extending wireless coverage into new areas typically requires building new sites that typically requires right of way (zoning) and capital expenditure which makes it costly and time consuming. Typically, if the service providers does not have spectrum to operate in the area then the service provider cannot build a wireless network in that area at all.

For a small service provider it may not be able to build new service areas fast enough to extend the reach and will have to sign expensive roaming agreements with the willing service providers. If the cost is passed on to the subscribers it may impede the subscriber growth.

An FCC initiative to open up 150 MHz of shared spectrum (3550 to 3700 MHz) will encourage new entrants to the markets. It is expected that a large number of private LTE networks will emerge using shared CBRS spectrum. Existing solutions may discourage new entrants if there is a no easy way to extend their service reach.

Some of the existing solutions to provide wireless services beyond home service areas are: roaming partnership, neutral host solution and network partnership using MOCN (Multi Operator Core Network).

The roaming partnership solution will now be described. Roaming allows subscribers to get services from a partner network. Roaming partnership requires financial and technical agreements that at times may not be financially favorable for a small service provider. A large service provider may not see any value in signing these agreements with a small service provider with only a few thousand subscribers. This might result in discouraging small operators from building their own networks and due to lack of roaming, and the small service provider may have trouble signing up more subscribers.

The neural host solution will now be described. Neutral host solutions combines signals from multiple service providers and uses passive solutions e.g. DAS (distributed antenna system) to distribute the combined signal in the target area e.g. shopping mall, airport, sports stadium etc. Participating in the neutral host system requires any service provider to build wireless network at target location to feed into neutral host solution provided they have spectrum holdings to use.

The MOCN (Multi Operator Core Network) solution will now be described. LTE technology allows up to 6 service providers to share the radio network. Setting up of MOCN network requires a lot of co-ordination among service providers and is a very complicated set up since radio resources are shared across service providers. This architecture to save cost of setting up wireless network didn't get much traction in USA. It is highly unlikely that a large operator will broadcast small operator information on their radio network. MOCN architecture is also limited to a total of 6 service providers. Since shared CBRS spectrum is expected to encourage a lot of private network builds, the MOCN architecture limitation to support up to 6 service providers may become a bottleneck in wireless network sharing.

Based on the above discussion, there is a need for new methods and apparatus to extend wireless services in LTE communications systems.

SUMMARY

In various embodiments an LTE access radio, e.g., a small LTE base station, operates as a shared host for one more service provider core networks. The number of service provider core networks can range from one to a large number, e.g., 6, 7 or even more. In at least some embodiments the LTE access radio broadcasts a shared PLMN identifier (sPLMN ID) which identifies the access radio as a shared host and does not identify a specific service provider core network. UEs are provisioned with the PLMN ID of their home network service providers and what are known as shared PLMN IDs (sPLMN IDs) because they are IDs which the UE can also use to access services via their home service provider. In various embodiments a shared PLMN ID, which can be used to access the home service provider network, e.g., via an LTE network extension system including an LTE access gateway, is stored in UEs allowing them to connect to the home network via an access radio transmitting the shared PLMN ID.

By designating a PLMN ID as a shared PLMN ID (sPLMN ID), a single PLMN identifier can be broadcast by multiple different access radios with the service provider core networks supported by the different access radios using the same PLMN identifier potentially, and in some cases actually, being different. The different access radios transmitting the same shared PLMN identifier may, and sometimes do, support different numbers of service provider core networks. In this way the number of service provider core networks a shared host can support is not limited by the number of PLMN identifiers it can transmit which in many cases is limited to 6 PLMN IDs.

In various embodiments the LTE access radio, transmitting the shared PLMN ID, is coupled to the various service provider core networks which it supports via an LTE access gateway (LAG). In accordance with various features, the LTE access gateway is coupled to or includes an LTE access database (LAD), which includes information on which service provider core networks are supported by individual shared host access radios which are coupled to the LTE access gateway.

In at least some embodiments the LTE access gateway becomes an access policy enforcement point which is an addition to other access control components and functions which may be, and often are, located in the access radio and/or service provider core network system.

In various embodiments a UE seeking to obtain service from a service provider core network with which the user of the UE has a service agreement, and thus the UE has a right to obtain service, may receive the shared PLMN ID from a shared host access radio. After receiving the shared PLMN ID, a UE including the shared PLMN ID in its list of PLMN IDs as an sPLMN may, and sometimes does, seek to obtain services from its home service provider core network via an access radio transmitting the shared PLMN ID. The UE seeks to obtain services by sending an attach request to the LTE access radio transmitting the shared PLMN ID. In the attach message the UE includes its own mobile identity information, e.g., IMSI which includes as part of the IMSI an identifier of the UE's home service provider core network which is to provide the UE its service.

An exemplary method of operating an LTE communications system in accordance with some embodiments, includes: storing in a storage device service provider core network access information for a plurality of different service provider core networks associated with a first shared PLMN ID (sPLMN ID), said service provider core network access information including a PLMN ID of each individual service provider core network and corresponding address information for the individual service provider core network for which a PLMNID is stored; operating an LTE access radio to transmit said first shared PLMN ID; and operating the LTE access radio to receive a first attach request from a first user equipment (UE) device.

While various features and methods have been described, all embodiments need not include all features or steps mentioned in the summary. Numerous additional features and embodiments are discussed in the detailed description which follows.

BRIEF DESCRIPTION OF THE FIGURES

FIG. 1 is a drawing of an exemplary communications system, e.g., an LTE communications system including an LTE network extension (LNE) system, in accordance with an exemplary embodiment.

FIG. 2C is a third part of an exemplary signaling diagram including exemplary LTE Network Extension Call Flow in accordance with an exemplary embodiment.

FIG. 2 comprises the combination of FIG. 2A, FIG. 2B and FIG. 2C.

FIG. 3A is a first part of a drawing of an exemplary Attach Request message, which is used by a LAG to identify target PLMN (310-014), in accordance with an exemplary embodiment.

FIG. 3B is a send part of a drawing of an exemplary Attach Request message, which is used by a LAG to identify target PLMN (310-014), in accordance with an exemplary embodiment.

FIG. 3C is a third part of a drawing of an exemplary Attach Request message, which is used by a LAG to identify target PLMN (310-014), in accordance with an exemplary embodiment.

FIG. 3D is a fourth part of a drawing of an exemplary Attach Request message, which is used by a LAG to identify target PLMN (310-014), in accordance with an exemplary embodiment.

FIG. 3E is a fifth part of a drawing of an exemplary Attach Request message, which is used by a LAG to identify target PLMN (310-014), in accordance with an exemplary embodiment.

FIG. 3F is a sixth part of a drawing of an exemplary Attach Request message, which is used by a LAG to identify target PLMN (310-014), in accordance with an exemplary embodiment.

FIG. 8B is a drawing of a second part of an exemplary assembly of components, which may be included in a LTE access gateway (LAG) in accordance with an exemplary embodiment.

FIG. 8 comprises the combination of FIG. 8A and FIG. 8B.

DETAILED DESCRIPTION

Figure 2A:
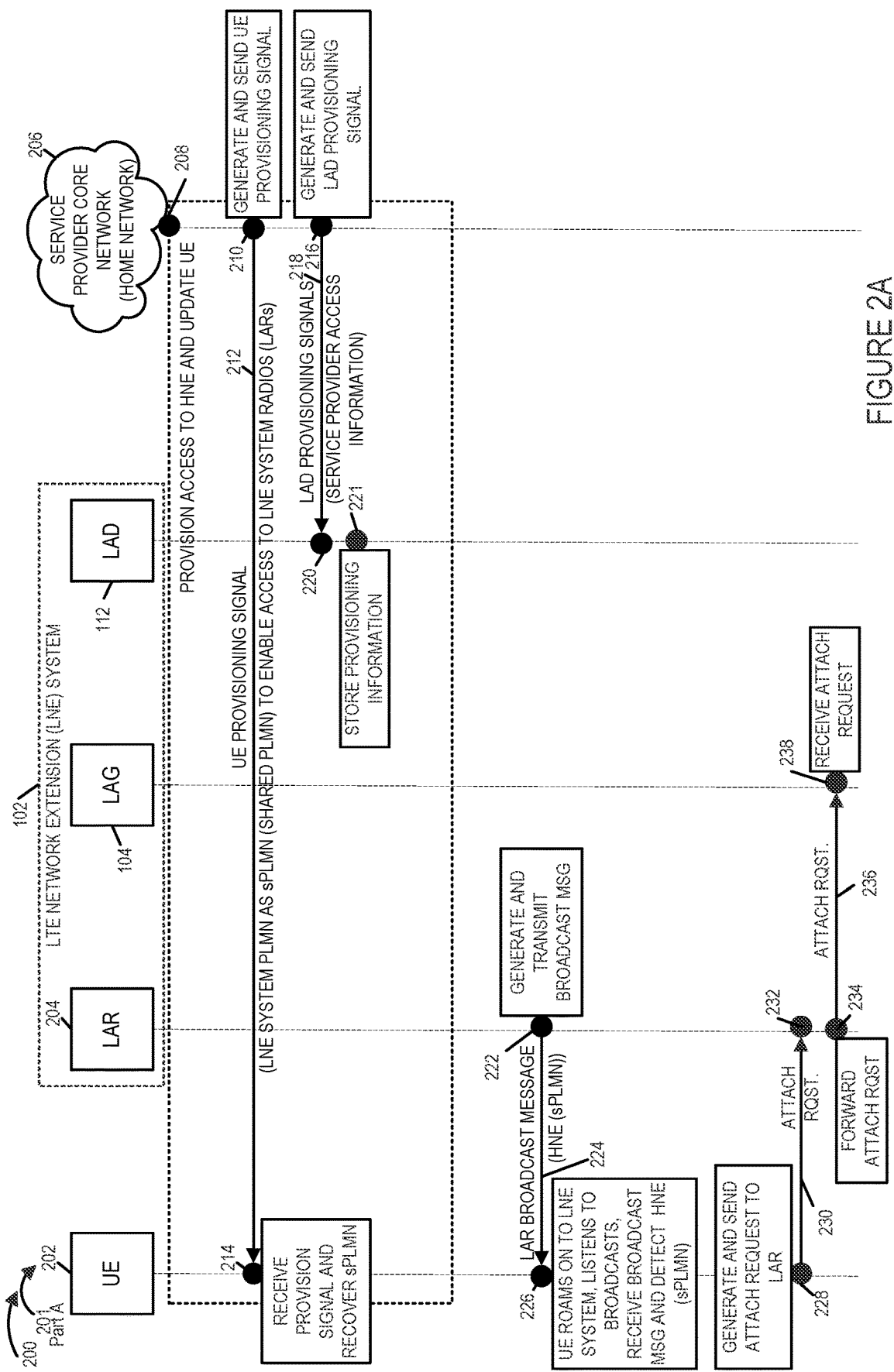
FIG. 2A is a first part of an exemplary signaling diagram including exemplary LTE Network Extension Call Flow in accordance with an exemplary embodiment.

FIG. 1 is a drawing of an exemplary communications system 100 in accordance with an exemplary embodiment. Exemplary communications system 100 includes an LTE network extension (LNE) system 102, a plurality of service provider core networks (service provider 1 (SP1) core network 116, service provider 2 (SP2) core network 118, . . . , service provider N (SPN) core network 120), and a plurality of user equipment (UE) devices (UE 1A 122, UE2A 124, . . . , UEN1A 126, UE 1B 128, . . . , UEN2B 130, UE 1C 132, UE2C 134, . . . , UEN3C 136).

LNE system 102 includes an LTE access gateway (LAG) 104, a plurality of LTE access radios (LTE access radio (LAR) 1 106, LTE access radio (LAR) 2 108, . . . , LTE access radio (LAR) M110), and a LTE access database (LAD) 112 coupled together. LAG 104 is coupled to the service provider core networks (SP1 core network 116, SP2 core network 118, . . . , SPN core network 120), via communications links (146, 148, 150) respectively. LAG 104 is coupled to the LTE access radios (LAR 1 106, LAR 2 108, . . . , LAR M 110), via communications links (138, 140, . . . , 142), respectively. LAG 112 is coupled to LAD 112 via communications link 144.

UE devices (UE 1A 122, UE2A 124, . . . , UEN1A 126) are associated with service provider 1 (SP1). UE devices (UE 1B 128, . . . , UEN2B 130) are associated with service provider 2 (SP2). UE devices (UE 1C 132, UE2C 134, . . . , UEN3C 136) are associated with service provider N (SPN).

Each of the LTE access radios (LAR 1 106, LAR 2 108, . . . , LAR M 110) broadcasts the same single PLMN, sometime referred to as a shared PLMN (sPLMN), which in this example is: 777-000. Service provider 1 (SP1) core network 116 corresponds to 310-001. Service provider 2 (SP2) core network 118 corresponds to 311-002. Service provider N (SPN) core network 120 corresponds to 312-00N.

LTE access database (LAD) 112 includes data/information 114 mapping single PLMN 777-000, corresponding to the set of LARs (106, 108, . . . , 110) in LNE system 102 to a plurality of different numbers (310-001, 311-002, . . . , 312-00N) corresponding to different service provider core networks (SP1 core network 116, SP2 core network 118, . . . , SPM core network 120).

Each of the LARs (LAR 1 106, LAR2 108, . . . , LAR M 110) transmits wireless signals (152, 156, 160) and receives wireless signals (154, 158, . . . , 160), respectively. Each of the UE devices (UE 1A 122, UE2A 124, . . . , UEN1A 126, UE 1B 128, . . . , UEN2B 130, UE 1C 132, UE2C 134, . . . , UEN1C 136) transmits wireless signals (162, 166, . . . , 170, 174, . . . , 178, 182, 186, . . . , 190), and receives wireless signals (164, 168, . . . , 172, 176, . . . , 180, 184, . . . , 192), respectively.

LNE systems, e.g., LNE system 102, will broadcast a single shared PLMN, e.g. 777-000, using LTE access radios (LAR) in the LNE system, e.g., LAR 1 106, LAR 2 108, . . . , LAR M 110 included in LNE system 102. These radios (LAR), e.g., LAR 1 106, LAR 2 108, LAR M 110, will be used to provide services to participating service provider's subscribers.

A new novel component of novel LNE system is the LTE Access Gateway (LAG), e.g., LAG 104 of LTE 102. LAG, e.g., LAG 104, will control the access to LNE system, e.g., LNE system 102, and will act as a proxy between LAR and target service provider network. LAG, e.g., LAG 104, will authenticate if the subscriber UE (user equipment), e.g., UE 1A 122, requesting access to wireless network is allowed to access services based on provisioned information in the LNE Access Database (LAD), e.g., LAD 112. Once the access is authorized LAG will act as a transparent bridge between LTE radios and target service provider's core network. LAG will act as a core to LAR and as a radio (LAR) towards service provider core network. LAD, e.g., LAD 112, will maintain a list of participating (authorized) service providers, e.g., SP1 116, SP2 118, . . . , SP N 120, and their network access information (e.g. IP routing).

Figure 2B:
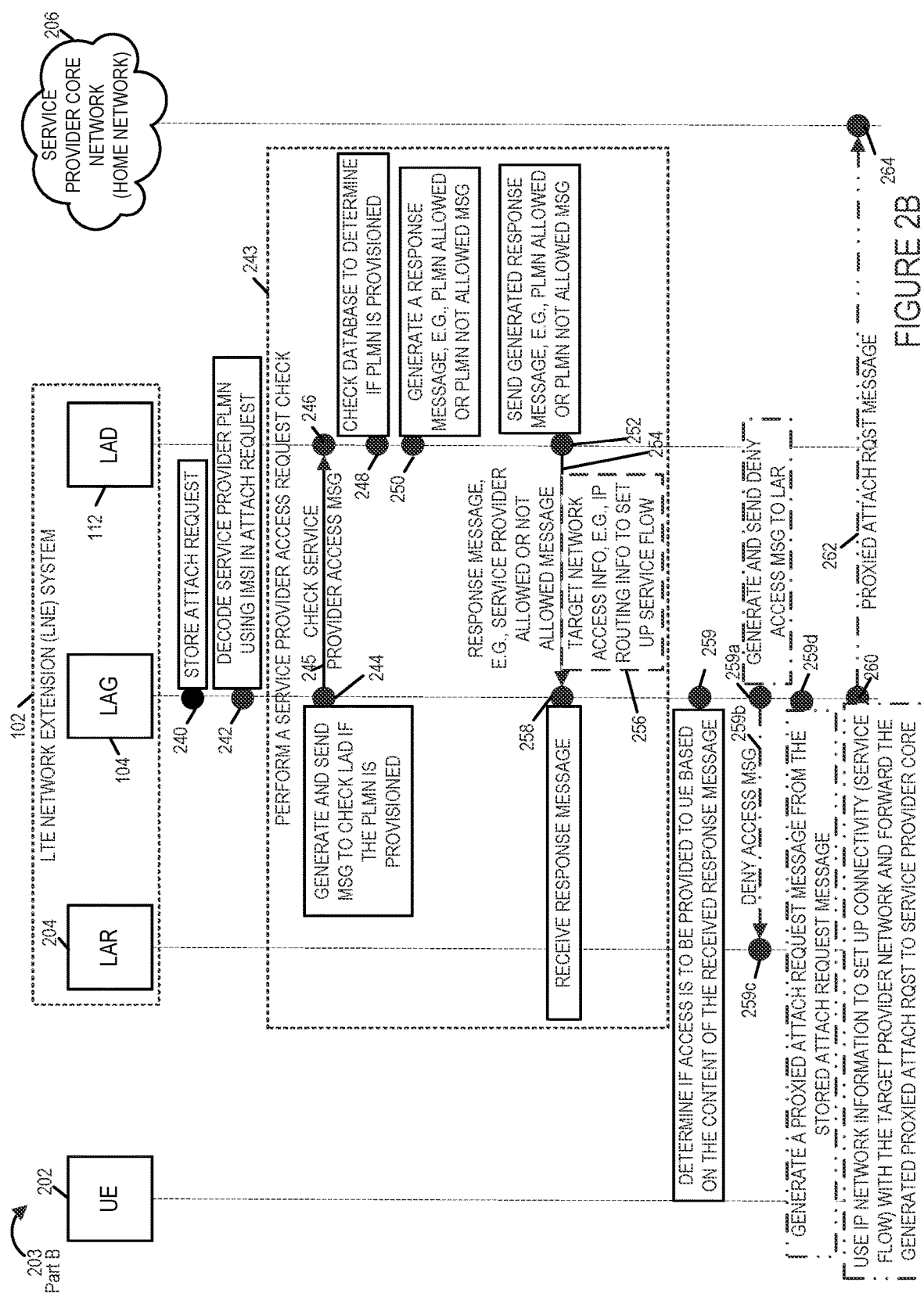
FIG. 2B is a second part of an exemplary signaling diagram including exemplary LTE Network Extension Call Flow in accordance with an exemplary embodiment.

FIG. 2, comprising the combination of FIG. 2A, FIG. 2B and FIG. 2C, is a drawing of an exemplary signaling diagram 200, comprising part A 201, part B 203 and part C 205, in accordance with an exemplary embodiment. Signaling diagram 200 illustrates an exemplary LTE Network Extension Call Flow in accordance with an exemplary embodiment. Signaling diagram 200 illustrates exemplary call flow information that will be used by various entities (network elements) to enable access to wireless services provided by the LNE system 102.

Signaling diagram 200 includes user equipment (UE) device 202, LTE network extension (LNE) system 102 and service provider core network 206. LAR 204 is, e.g., one of LAR 1 106, LAR 2 108, . . . , LAR M 110. UE device 202 is, e.g., one of the UEs (122, 124, . . . , 126, 128, . . . , 130, 132, 134, . . . , 136) of system 100 and service provider core network 206 is, e.g., one of the service provider networks (116, 118, . . . , 120) of system 100. Service provider core network 206 is the home network for UE 202. For example, in one embodiment, UE 202 is one of (UE 1A 122, UE2A 124, . . . , UEN1A 126) and service provider network 206 is SP1 core network 116. In another embodiment, UE 202 is one of (UE 1B 128, . . . , UEN2B 130) and service provider network 206 is SP2 core network 118. In another embodiment, UE 202 is one of (UE 1C 132, UE 2C 134, . . . , UEN3C 136) and service provider network 206 is SPN core network 120.

Operation starts in step 208 in which the service provider home network 206 provisions access to the home network extension (HNE) and updates UE 202. Step 208 includes steps 210, which provisions the UE 202, and step 216, which provisions the LAD 112. In step 210 the service provider core network generates and sends UE provisioning signal 212 to UE 202. UE provisioning signal 212 communicates a LNE system 102 PLMN ID as a shared PLMN (sPLMN) to enable access to the LNE system 102, which includes LAR 204. In step 214, UE 202 receives provisioning signal 212 and recovers the communicated sPLMN ID. In step 210 the service provider core network 206 generates and sends LAD provisioning signals 218 to LAD 112. LAD provisioning signals 218, in some embodiments, includes service provider access information that includes target network address information and a home PLMN ID for the UE (UE's service provider PLMN ID). In various embodiments, the information communicated in LAD provisioning signals includes service provider core network access information for a plurality of different service provider core networks associated with a first shared PLMIN ID, e.g, 777-000, said service provider core network access information including a PLMN ID of each individual service provider core network and corresponding address information including for the individual service provider core network for which a PLMN is stored. For example, each of the service provider core networks 116, 118, . . . 120, may send a provisioning signal 218 to LAD 112. In step 220 LAD 112 receives message 218, recovers the communicated information. In step 221 LAD 112 stores the recovered communicated information. When the provisioning signals from each of the service provider core network are aggregated, the LAD 112 includes stored service provider core network access information including a PLMN ID of each individual service provider core network and corresponding address information including for the individual service provider core network for which a PLMN is stored.

In step 222, LAR 204 generates and transmits LAR broadcast message 224. LAR broadcast message 224 includes the LNE sPLMN ID, e.g., 777-000. Sometimes the LNE sPLMN ID is referred to as HNE sPLMN ID. In step 226 UE 202 roams on to the LNE system 102, listens to broadcasts, receives broadcast message 224 and detects HNE sPLMN ID, e.g., detects 777-000. In step 228, UE 202 generates and sends an attach request message 230 to LAR 204, e.g., in response to having detected the shared PLMN ID. The attach request message 230 includes the PLMN ID of the home network of the UE 202, e.g., as part of the IMSI.

In step 232, LAR 204 receives attach request 232. In step 234, LAR 204 forwards the received attach request message 230, as attach request message 236, to LAG 104. In step 238 LAG 104 receives attach request message 236.

In step 240, LAG 104 stores the received attach request. In step 242 LAG 104 decodes the service provider PLMN ID using the International Mobile Subscriber Identity (IMSI) in the received attach request message.

In step 243 the LNE system 102 performs a service provider access request check. Step 243 includes steps 244, 246, 248, 250, 252, and 258. In step 244, LAG 104 generates and sends a check service provider access message 245 to LAD 112 requesting LAD 112 to check if the decoded PLMN is provisioned. In step 246 LAD 112 receives message 245 and recovers the communicated information, and in step 248 LAD 112 checks its database to determine if the PLMN is provisioned. In step 250, LAD 112 generates a response message 254, e.g., a PLMN allowed message or a PLMN not allowed message, based on the determination of step 248. In step 252, LAD 112 sends the generated response message 254 to LAG 104. In some embodiments, in the case where response message 254 is a service provider allowed message, e.g., PLMN, allowed message, response message 254 includes target network access information, e.g., IP network routing information to set up a service flow.

In step 258, LAG receives response message 254 and recovers the communicated information.

In step 259 the LAG 104 determines if access is to be provided to UE 202 based on the content of received response message. If the determination of step 259 is that access is not to be provided, then operation proceeds from step 259 to step 259a, in which the LAG 104 generates and sends deny access message 259b to LAR 204, which receives message 259b in step 259c. However, if the determination of step 259 is that access is to be provided, then operation proceeds from step 259 to step 259d, in which LAG 104 generates a proxied attach request message 262 from the stored attach request. In step 260 LAG 104 uses IP network information to set up connectivity (service flow) with the target provider network and sends, the generated proxied attach request message 262, to service provider core network 206. In step 264, the service provider core network 206 receives proxied attach request message 262 and recovers the communicated information.

In step 266 the LAG 104 operates as a proxy between LAR 204 and service provider 206 for further exchanges of control information and data to/from UE 202.

In step 268 service provider core network 206 authenticates the UE 202. In step 270, service provider core network 206 generates and sends UE attach accept signal 272 to UE 202. Attach accept signal 272 is received by UE 202, which recovers the communicated information. In step 276, service provider core network 206 generates and sends an end to end connectivity (bearer) established signal 276 to UE 202. In step 278, UE 202 receives signal 276 and recovers the communicated information. In step 280 UE 202 determines that it is allowed to access home network 206 over the LNE system 102 and performs normal LTE service operations.

In steps 282 and 284, the UE 202 and service provider core network 206 are operated to interact including signaling 286 over the home network extension 102, e.g., with LAG 104 serving as a proxy.

In one exemplary embodiment, UE 202 is UE 1A 122, service provider core network 206 is SP1 core network 116, LTE access radio 204 is LAR 1 106, the shared PLMN (sPLMN) ID, which is broadcast is 777-000, and UE' 202s home network service provider core PLMN ID=310-001.

In another exemplary embodiment, UE 202 is UE 1B 128, service provider core network 206 is SP2 core network 118, LTE access radio 204 is LAR 2 108, the shared PLMN (sPLMN) ID, which is broadcast is 777-000, and UE' 202s home network service provider core PLMN ID=311-002.

In another exemplary embodiment, UE 202 is UE 1C 132, service provider core network 206 is SPN core network 120, LTE access radio 204 is LAR 1 106, the shared PLMN (sPLMN) ID, which is broadcast is 777-000, and UE' 202s home network service provider core PLMN ID=311-00N.

Figure 3:
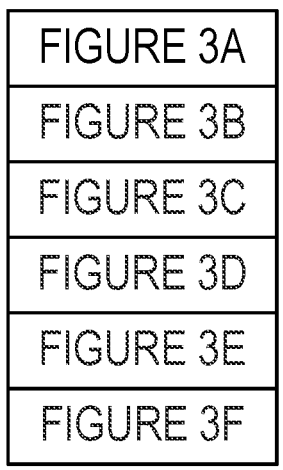
FIG. 3, comprises the combination of FIG. 3A, FIG. 3B, FIG. 3C, FIG. 3D, FIG. 3E and FIG. 3F.

FIG. 3, comprising the combination of FIG. 3A, FIG. 3B, FIG. 3C, FIG. 3D and FIG. 3E, is a drawing of an exemplary Attach Request message 300, comprising Part A 301, Part B 303, Part C 305, Part D 307, Part E 309 and Part F 311, which is used by a LAG, e.g., LAG 104, to identify target PLMN (310-014).

Figure 4A:
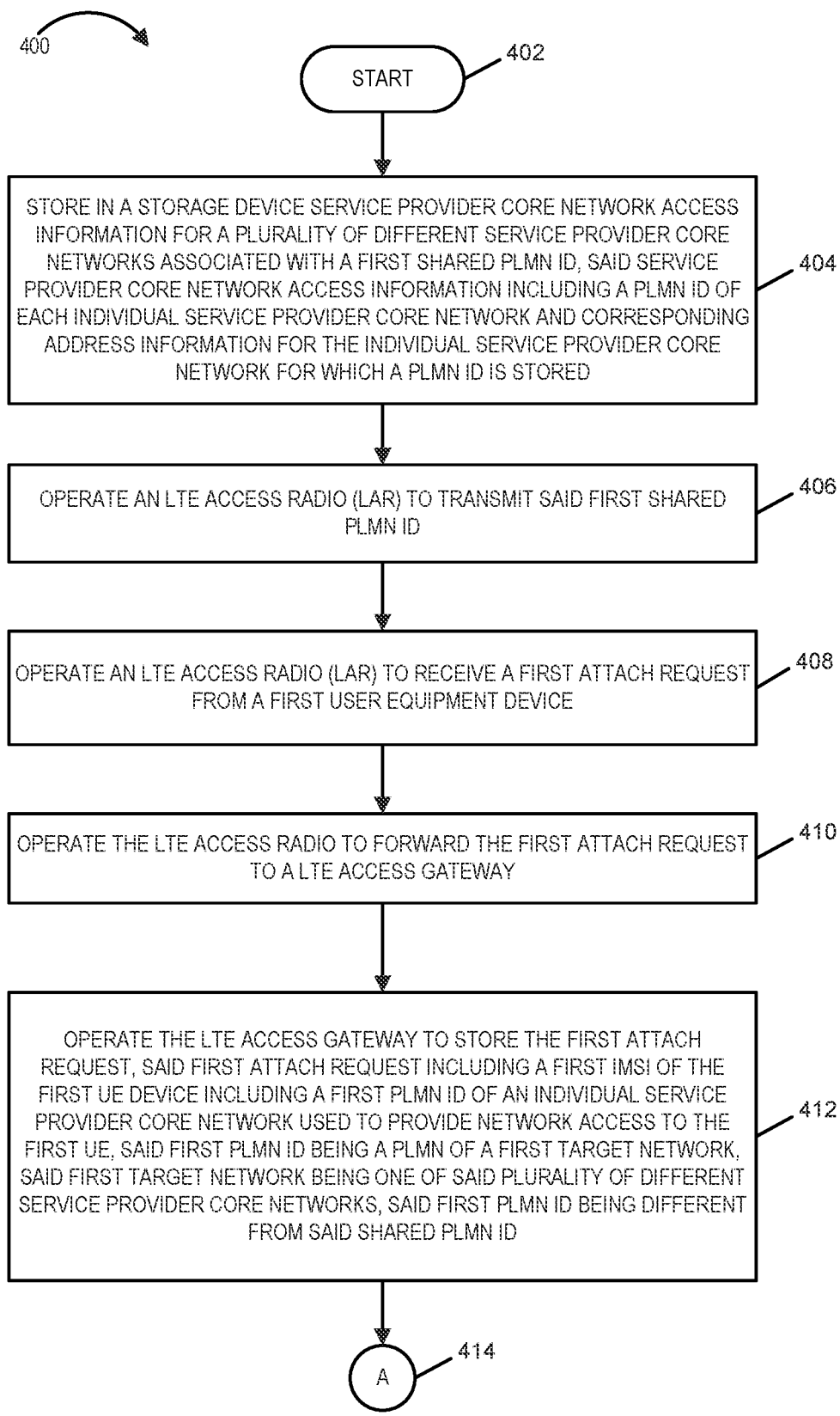
FIG. 4A is first part of a flowchart of an exemplary method of operating an LTE communications system, e.g., an LTE communications system including an LTE network extension (LNE) system, in accordance with an exemplary embodiment.
Figure 4B:
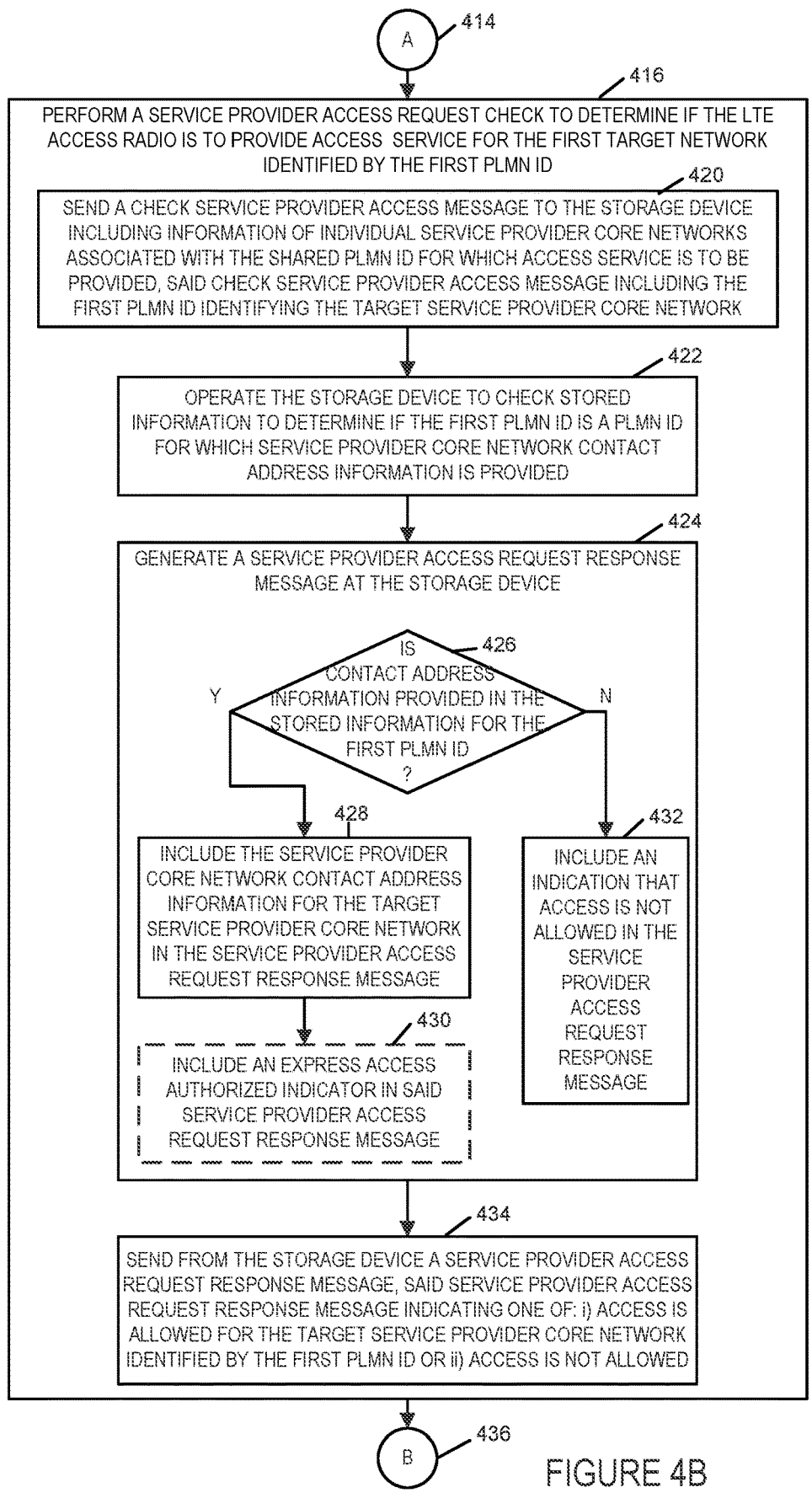
FIG. 4B is second part of a flowchart of an exemplary method of operating an LTE communications system, e.g., an LTE communications system including an LTE network extension (LNE) system, in accordance with an exemplary embodiment.
Figures 4, 4A, 4B, 4C:
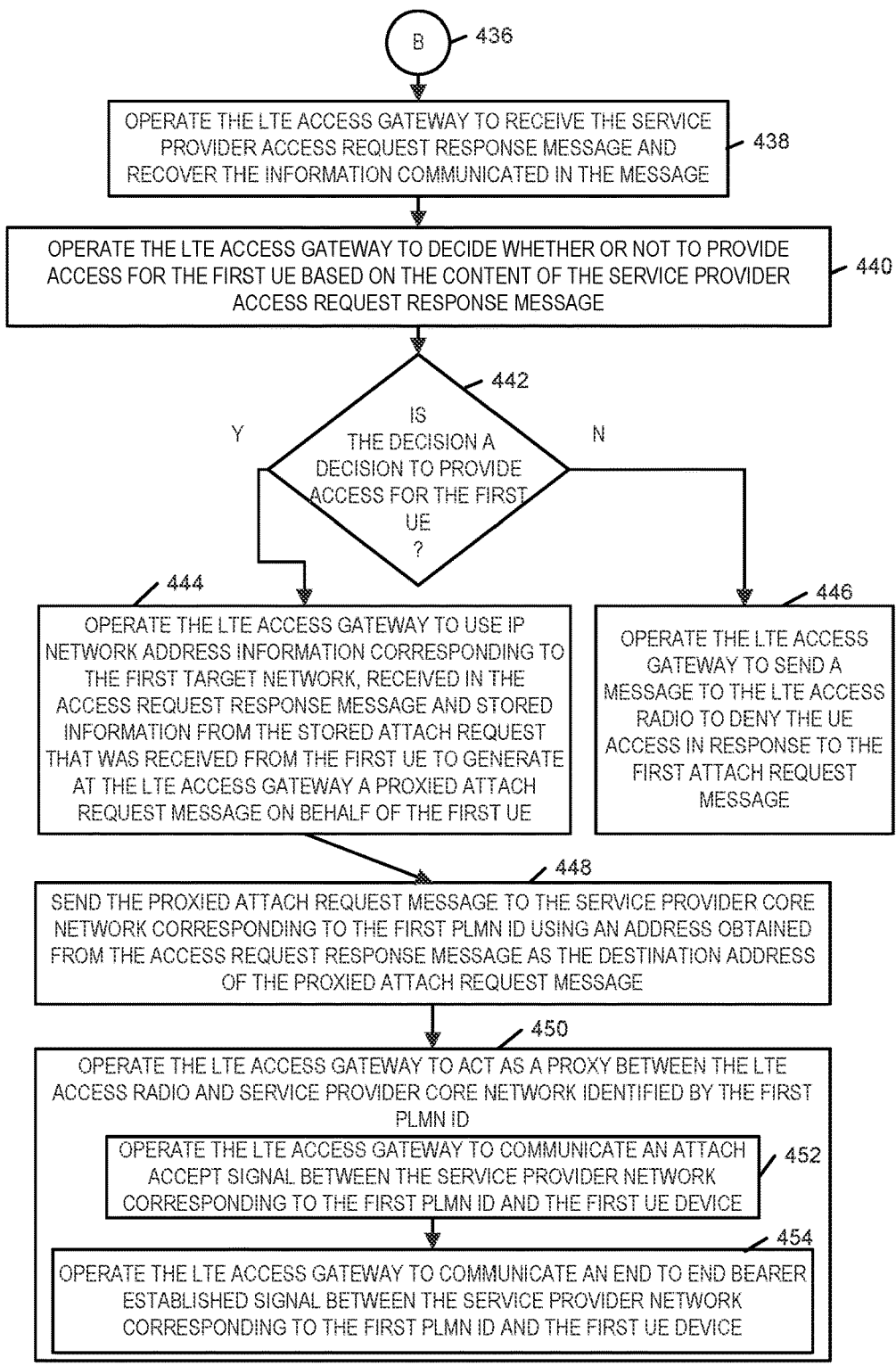
FIG. 4C is third part of a flowchart of an exemplary method of operating an LTE communications system, e.g., an LTE communications system including an LTE network extension (LNE) system, in accordance with an exemplary embodiment.
FIG. 4 comprises the combination of FIG. 4A, FIG. 4B and FIG. 4C.

FIG. 4, comprising the combination of FIG. 4A, FIG. 4B and FIG. 4C, is a flowchart 400 of an exemplary method of operating an LTE communications system in accordance with an exemplary embodiment. The LTE communications system is, e.g., LTE communications system 100 of FIG. 1 including LTE network extension system 102.

The exemplary method starts in step 402, in which the system is powered on and initialized and proceeds to step 404. In step 404 service provider core network access information for a plurality of different service provider core networks associated with a first shared PLMN ID is stored in a storage device, said service provider core network access information including a PLMN ID of each individual service provider core network and corresponding address information for the individual service provider core network for which a PLMN ID is stored. Operation proceeds from step 404 to step 406.

In step 406 an LTE access radio (LAR) is operated to transmit, e.g., in a broadcast message, said first shared PLMN ID, e.g., 777-000. The LTE access radio is, e.g., one of LAT 1 106, LAR 2 108, . . . , LAR 110 of FIG. 1 or LAR 204 of FIG. 2. Operation proceeds from step 406 to step 408.

In step 408 the LTE access radio is operated to receive a first attach request from a first user equipment (UE) device, e.g., said first attach request having been transmitted by said first UE in response to said first UE receiving said first shared PLMN ID. The UE device is, e.g. one of UEs (122, 124, . . . , 126, 128, . . . , 130, 132, 134, . . . , 136) of FIG. 1 or UE 202 of FIG. 2. Operation proceeds from step 408 to step 410.

In step 410 the LTE access radio is operated to forward the first attach request to a LTE access gateway, e.g., LAG 104. Operation proceeds from step 410 to step 412.

In step 412 the LTE access radio is operated to store the first attach request, said first attach request including a first IMSI of the first UE device, said first IMSI including a first PLMN ID of an individual service provider core network used to provide network access to the first UE, said first PLMN ID being a PLMN of a first target network, said first target network being one of said plurality of different service provider core networks, said first PLMN ID being different from said shared PLMN ID. Operation proceeds from step 412, via connecting node A 414, to step 416.

In step 416, the LTE network extension (LNE) system performs a service provider access request check to determine if the LTE access radio is to provide access service for the first target network identified by the first PLMN ID. Step 416 includes steps 420, 422, 424, and 434. In step 420 the LTE access gateway sends a check service provider access message to the storage device, e.g., LAD 122, including information of individual service provider core networks associated with the shared PLMN ID for which access service is to be provided, said check service provider access message including the first PLMN ID identifying the target service provider core network. Operation proceeds from step 420 to step 422.

In step 422 the storage device is operated to check stored information to determine if the first PLMN ID is a PLMN ID for which service provider core network contact address information is provided. Operation proceeds from step 422 to step 424.

In step 424 the storage device generates a service provider access request response message. Step 424 includes steps 426, 428, 432, and in some embodiments, step 430. In step 426 if the determination is that the contact address information is provided in the stored information for the first PLMN ID, then operation proceeds from step 426 to step 428; otherwise, operation proceeds from step 426 to step 432.

Returning to step 428, in step 428 the storage device includes the service provider core network contact address information for the target service provider core network in the service provider access request response message. In some embodiments, operation proceeds from step 428 to optional step 430 in which an express access authorized indicator is included in said service provider access request response message. In embodiments, in which step 430 is omitted, the inclusion of the service provider core network address information in the response message is used to inform the LTE access gateway that the service provider request response message is indicating access authorized.

Returning to step 432, in step 432 the storage device includes an indication that access is not allowed in the service provider access request response message. Operation proceeds from step 424 to step 434.

In step 434, the storage device sends the generated service provider access request response message to the LTE access gateway, said service provider access request response message indicating one of: i) access is allowed for the that target service provider core network identified by the first PLMN ID or ii) access is not allowed.

Operation proceeds from step 418, via connecting node B 436, to step 438. In step 438 the LTE access gateway is operated to receive the service provider access request response message and recover the information communicated in the message. Operation proceeds from step 438 to step 440.

In step 440, the LTE access gateway is operated to decide whether or not to provide access for the first UE device based on the content of the service provider access request response message. Operation proceeds from step 440 to step 442.

In step 442, if the decision is a decision to provide access for the first UE, then operation proceeds from step 442 to step 444; however, if the decision is a decision to deny access for the first UE, then operation proceeds from step 442 to step 446.

In step 444, the LTE access gateway is operated to use IP network address information corresponding to the first target network, received in the access request response message and stored information from the stored attach request that was received from the first UE to generate at the LTE access gateway a proxied attach request message on behalf of the first UE. Operation proceeds from step 444 to step 448 in which the LTE access gateway sends the generated proxied attach request message to the service provider core network corresponding to the first PLMN ID using an address obtained from the access request response message as the destination address of the proxied attach request message. Operation proceeds from step 448 to step 450.

In step 450, the LTE access gateway is operated to act as a proxy between the LTE access radio and service provider core network identified by the first PLMN ID. Step 450 includes steps 452 and 454. In step 452 the LTE access gateway is operated to communicate an attach accept signal between the service provider network corresponding to the first PLMN and the first UE device. In step 454 the LTE access gateway is operated to communicate an end to end bearer established signal between the service provider network corresponding to the first PLMN and the first UE device.

Returning to step 446, in step 446, the LTE access gateway is operated to send a message to LTE access radio to deny the UE access in response to the first attach request message.

Figure 5:
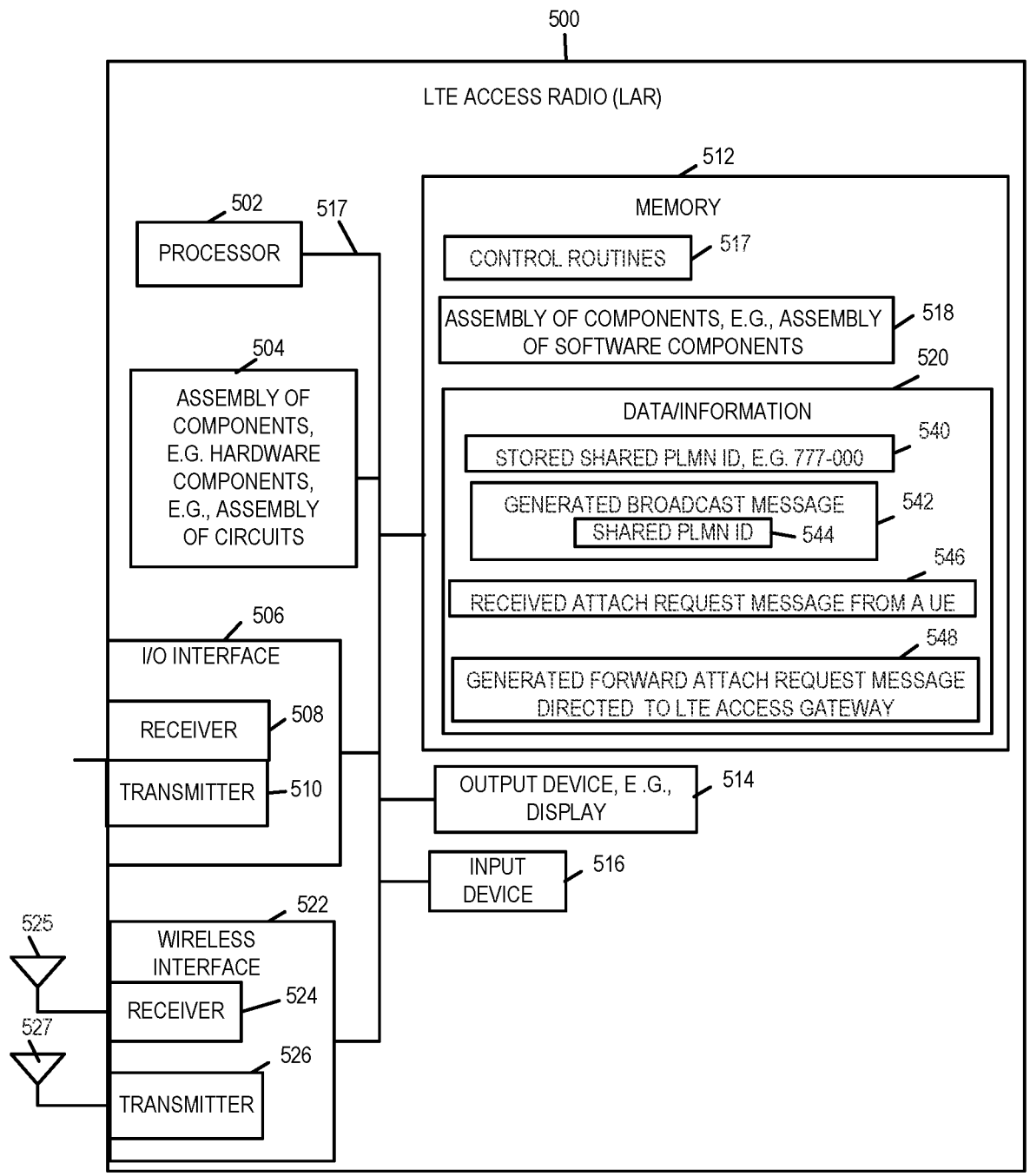
FIG. 5 is a drawing of an exemplary LTE access radio (LAR) in accordance with an exemplary embodiment.

FIG. 5 is a drawing of an exemplary LTE access radio (LAR) 500 in accordance with an exemplary embodiment. LTE access radios (LAR 1 106, LAR 2 108, . . . , LAR M 110) of FIG. 1 and LAR 204 of FIG. 2, are, e.g., LARs implemented in accordance with LAR 500 of FIG. 5.

LTE access radio 500 includes a processor 502, e.g., a CPU, an assembly of components 504, e.g., an assembly of hardware components, e.g., assembly of circuits, an I/O interface 506, a wireless interface 522, memory 512, an output device 514, e.g., a display, and an input device, e.g., a keyboard, mouse, etc., coupled together via a bus 517 via which the various components (502, 504, 506, 522, 512, 514, 516) may exchange data and information. I/O interface 506 includes a receiver 508 and a transmitter 510, via which the LTE access radio 500 may receive signals and send signals, e.g., from/to other devices, e.g., an LTE access gateway. Wireless interface 522 includes a wireless receiver 524 and a wireless transmitter 526. Wireless receiver 524 is coupled to receive antenna 525, via which the LTE access radio may receive wireless signals, e.g., LTE wireless signals, from a UE device. Wireless transmitter 526 is coupled to transmit antenna 527, via which the LTE access radio may transmit wireless signals, e.g., LTE wireless signals, to a UE device. In some embodiments, the same antenna is used for receiver 524 and transmitter 526. Memory 512 includes control routines 517 configured to control operation of the various interfaces and devices included in LAR 500, an assembly of components 518, e.g., an assembly of software components, and data/information 520. Data/information 520 includes a stored shared PLMN ID (sPLMN ID) 540, e.g., sPLMN ID=777-000, a generated broadcast message 542 including information 544, which is a copy of the stored sPLMN ID 540, a received attach request message from a UE device 546, e.g., which was transmitted in response to the UE detecting the shared PLMN ID of broadcast message 542, an a generated forwarded attach request message 548 directed to an LTE gateway.

Figure 6:
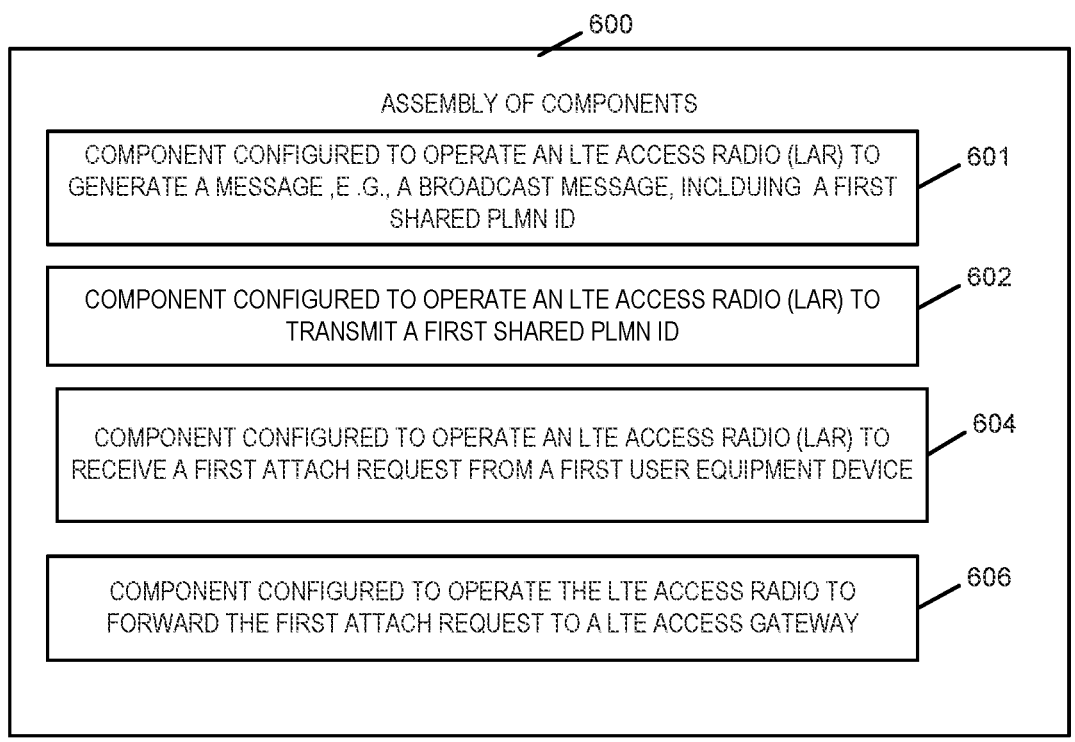
FIG. 6 is a drawing of an exemplary assembly of components, which may be included in a LTE access radio (LAR) in accordance with an exemplary embodiment.

FIG. 6 is a drawing of an exemplary assembly of components 600, which may be included in a LTE access radio (LAR) 500 in accordance with an exemplary embodiment. Assembly of components 600 can be, and in some embodiments is, used in LTE access radio (LAR) 500 of FIG. 5. The components in the assembly of components 600 can, and in some embodiments are, implemented fully in hardware within the processor 502, e.g., as individual circuits. The components in the assembly of components 600 can, and in some embodiments are, implemented fully in hardware within the assembly of components 504, e.g., as individual circuits corresponding to the different components. In other embodiments some of the components are implemented, e.g., as circuits, within the processor 502 with other components being implemented, e.g., as circuits within assembly of components 504, external to and coupled to the processor 502. As should be appreciated the level of integration of components on the processor and/or with some components being external to the processor may be one of design choice. Alternatively, rather than being implemented as circuits, all or some of the components may be implemented in software and stored in the memory 512 of the LAR 500, with the components controlling operation of LAR 500 to implement the functions corresponding to the components when the components are executed by a processor, e.g., processor 502. In some such embodiments, the assembly of components 600 is included in the memory 512 as assembly of components 518. In still other embodiments, various components in assembly of components 600 are implemented as a combination of hardware and software, e.g., with another circuit external to the processor providing input to the processor 502 which then under software control operates to perform a portion of a component's function. While processor 502 is shown in the FIG. 5 embodiment as a single processor, e.g., computer, it should be appreciated that the processor 502 may be implemented as one or more processors, e.g., computers.

When implemented in software the components include code, which when executed by the processor 502, configure the processor 502 to implement the function corresponding to the component. In embodiments where the assembly of components 600 is stored in the memory 512, the memory 512 is a computer program product comprising a computer readable medium comprising code, e.g., individual code for each component, for causing at least one computer, e.g., processor 502, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 6 control and/or configure the LTE access radio 500 or elements therein such as the processor 502, to perform the functions of corresponding steps illustrated and/or described in the method of one or more of the flowcharts, signaling diagrams and/or described with respect to any of the Figures. Thus the assembly of components 600 includes various components that perform functions of corresponding one or more described and/or illustrated steps of an exemplary method, e.g., steps of the method of signaling diagram 200 of FIG. 2 and/or steps of the method of flowchart 400 of FIG. 4.

Assembly of components 600 includes a component 601 configured to generate a message, e.g. a broadcast message, including a first shared PLMN ID, a component 602 configured to operate an LTE access radio (LAR) to transmit a first shared PLMN ID, a component 604 configured to operate an LTE access radio to receive a first attach request from a first user equipment device, and a component 606 configured to operate the LTE access radio to forward the first attach request to a LTE access gateway. In various embodiemtns, component 602 is configured to control the LAR to transmit a broadcast message communicating the first shared PLMN ID, e.g., on a recurring basis.

Figure 7:
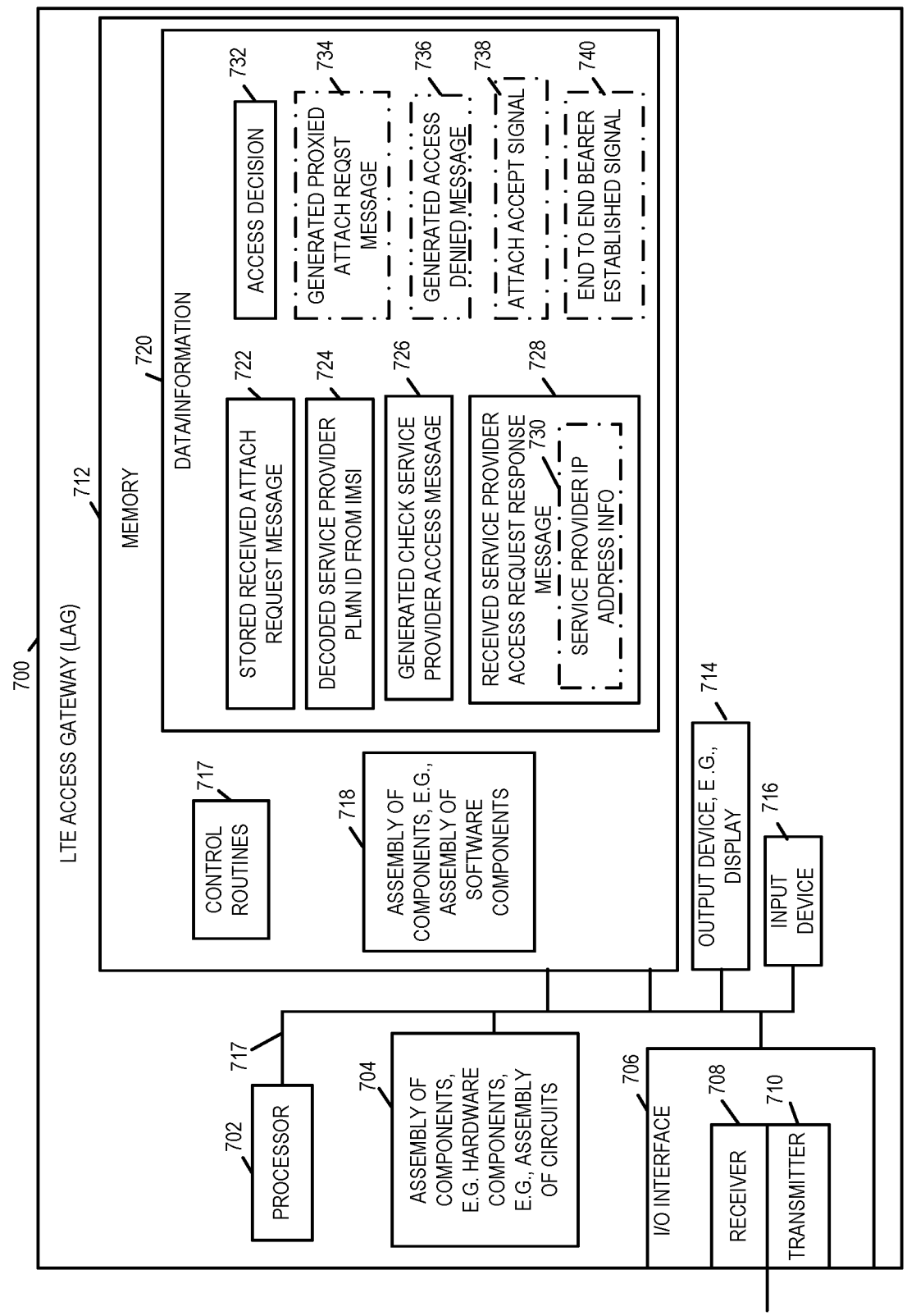
FIG. 7 is a drawing of an exemplary LTE access gateway (LAG) in accordance with an exemplary embodiment.

FIG. 7 is a drawing of an exemplary LTE access gateway (LAG) 700 in accordance with an exemplary embodiment. LAG 700 is, e.g., LAG 104 of FIG. 1 and FIG. 2. LTE access gateway 700 includes a processor 702, e.g., a CPU, an assembly of components 704, e.g., an assembly of hardware components, e.g., assembly of circuits, an I/O interface 706, memory 712, an output device 714, e.g., a display, and an input device 716, e.g., a keyboard, mouse, etc., coupled together via a bus 717 via which the various components (702, 704, 706, 712, 714, 716) may exchange data and information. I/O interface 706 includes a receiver 708 and a transmitter 710, via which the LTE access gateway 700 may receive signals and send signals, e.g., from/to other devices, e.g., an LTE access database, an LTE access radio, devices in a service provider core network, etc. Memory 712 includes control routines 714, which control various functions and operations of the interfaces and devices included in LAG 700, an assembly of components 718, e.g., an assembly of software components, and data/information 720. Data/information 720 includes a stored received attach request message 722, a decoded service provider PLMN ID 724 from the IMSI included the received attach request message, a generated check service provider access message 726, and a received service provider access request response message 728, which includes when access is allowed, service provider core network IP address information, an access decision 732. Data/information 720 includes, e.g., for the case in which the access request response is access allowed, a generated proxied attach request message 734, an attach accept signal 738, which is being forwarded while the LAG 700 is serving as a proxy, and an end to end bearer established signal 740, which is being forwarded while the LAG is serving as a proxy. Data/information 720 includes, e.g., for the case in which the access request response communicates access denied, a generated access denied message 736, which is to be sent to the access radio.

Figure 8A:
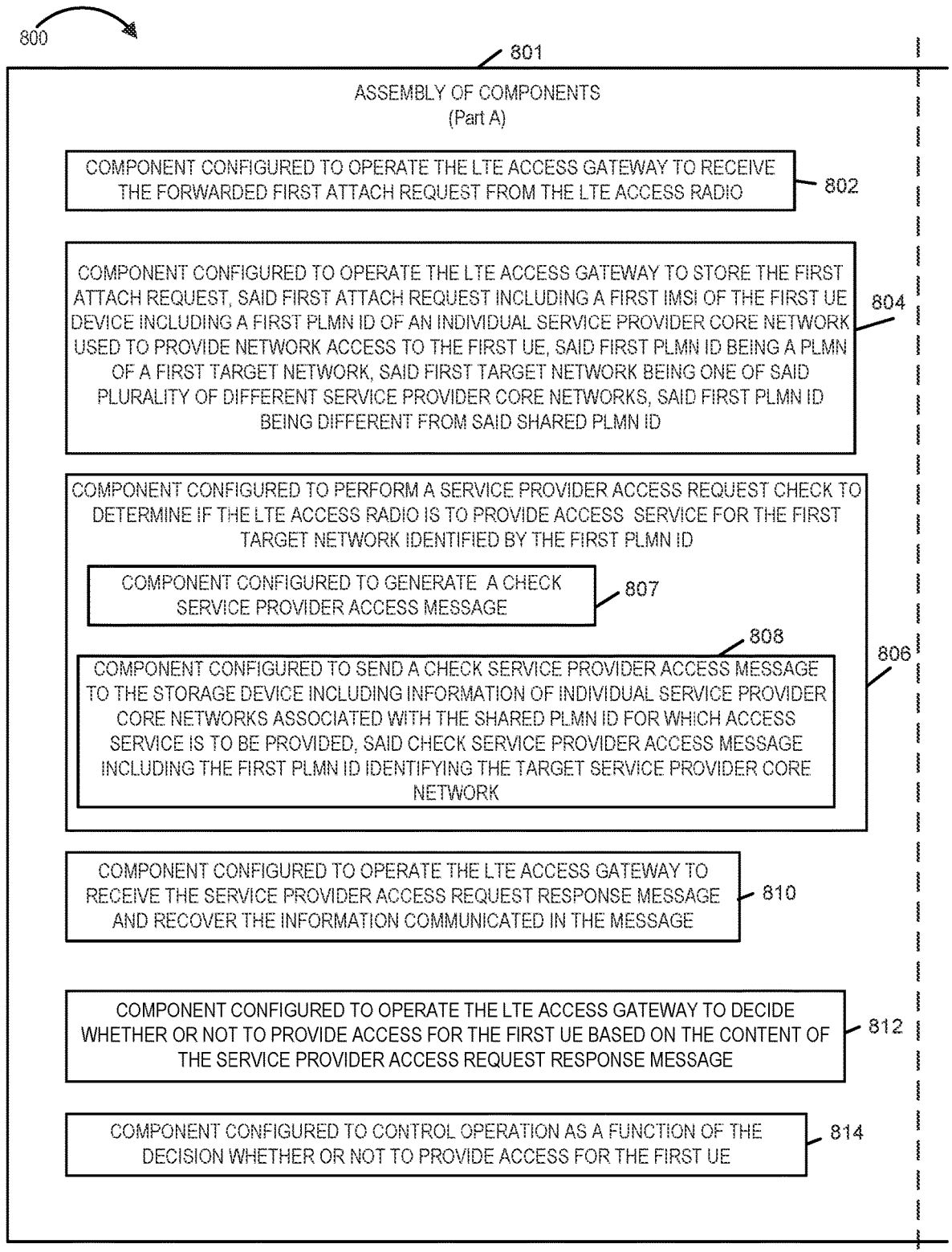
FIG. 8A is a drawing of a first part of an exemplary assembly of components, which may be included in a LTE access gateway (LAG) in accordance with an exemplary embodiment.

FIG. 8, comprising the combination of FIG. 8A and FIG. 8B, is a drawing of an exemplary assembly of components 800, comprising the combination of Part A 801 and Part B 803, which may be included in a LTE access gateway (LAG) 800 in accordance with an exemplary embodiment. Assembly of components 800 can be, and in some embodiments is, used in LTE access gateway (LAG) 700 of FIG. 7. The components in the assembly of components 800 can, and in some embodiments are, implemented fully in hardware within the processor 702, e.g., as individual circuits. The components in the assembly of components 800 can, and in some embodiments are, implemented fully in hardware within the assembly of components 704, e.g., as individual circuits corresponding to the different components. In other embodiments some of the components are implemented, e.g., as circuits, within the processor 702 with other components being implemented, e.g., as circuits within assembly of components 704, external to and coupled to the processor 702. As should be appreciated the level of integration of components on the processor and/or with some components being external to the processor may be one of design choice. Alternatively, rather than being implemented as circuits, all or some of the components may be implemented in software and stored in the memory 712 of the LAG 700, with the components controlling operation of LAG 700 to implement the functions corresponding to the components when the components are executed by a processor, e.g., processor 702. In some such embodiments, the assembly of components 800 is included in the memory 712 as assembly of components 718. In still other embodiments, various components in assembly of components 800 are implemented as a combination of hardware and software, e.g., with another circuit external to the processor providing input to the processor 702 which then under software control operates to perform a portion of a component's function. While processor 702 is shown in the FIG. 7 embodiment as a single processor, e.g., computer, it should be appreciated that the processor 702 may be implemented as one or more processors, e.g., computers.

When implemented in software the components include code, which when executed by the processor 702, configure the processor 702 to implement the function corresponding to the component. In embodiments where the assembly of components 800 is stored in the memory 712, the memory 712 is a computer program product comprising a computer readable medium comprising code, e.g., individual code for each component, for causing at least one computer, e.g., processor 702, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 8 control and/or configure the LTE access gateway 700 or elements therein such as the processor 702, to perform the functions of corresponding steps illustrated and/or described in the method of one or more of the flowcharts, signaling diagrams and/or described with respect to any of the Figures. Thus the assembly of components 800 includes various components that perform functions of corresponding one or more described and/or illustrated steps of an exemplary method, e.g., steps of the method of signaling diagram 200 of FIG. 2 and/or steps of the method of flowchart 400 of FIG. 4.

Assembly of components 800 includes a component 802 configured to operate the LTE access gateway to receive the forwarded first attach request from the LTE access radio, and a component 804 configured to operate the LTE access gateway to store the first attach request, said first attach request including a first IMSI of the first UE device including a first PLMN ID of an individual service provider core network used to provide network access to the first UE, said first PLMN ID being a PLMN ID of a first target network, said first target network being one of said plurality of different service provider core networks, said first PLMN ID being different from said shared PLMN ID. Assembly of components 800 further includes a component 806 configured to perform a service provider access request check to determine if the LTE access radio is to provide access service for the first target network identified by the first PLMN ID. Component 806 includes a component 807 configured to generate a check service provider access message, and a component 808 configured to send a check service provider access message to a storage device, e.g., a LTE access database, including information of the individual service provider core networks associated with the shared PLMN ID for which access service is to be provided, said check service provider access message including the first PLMN ID identifying the target service provider core network. Assembly of components 800 further comprises a component 810 configured to operate the LTE gateway device to receive a service provider access request response message and recover the information communicated in the message, a component 812 configured to operate the LTE access gateway to decide whether or not to provide access for the first UE based on the content of the received service provider access request response message, and a component 814 configured to control operation as a function of the decision whether or not to provide access for the first UE. Assembly of components 800 further includes a component 816 configure to operate the LTE access gateway to use IP network address information corresponding to the first target network, received in the access request response messaged and the stored attach request that was received from the first UE to generate at the LTE access gateway a proxied attach request message on behalf of the first UE, e.g., in response to a receiving access request response message communicating, e.g., indirectly via the including of IP network address information or directly via an access allowed indicator, that access is allowed, and a component 818 configured to operate the LTE access gateway to generate and send a message to LTE access radio to deny the UE access in response to the first attach request message, e.g., in response to receiving an access request response message indicating access is denied. Assembly of components 800 further includes a component 820 configured to send the generated proxied attach request message to the service provider core network corresponding to the first PLMN ID as the destination address of the proxied attach request message, and a component 822 configured to operate the LTE access gateway to act as a proxy between the LTE access radio and the service provider core network identified by the first PLMN ID. Component 822 includes a component 824 configured to operate the LTE access gateway to communicate an attach accept signal between the service provider network corresponding to the first PLMN ID and the first UE device and a component 826 configured to operate the LTE access gateway to communicate an END to END bearer established signal between the service provider network corresponding to the first PLMNID and the first UE device.

Figure 9:
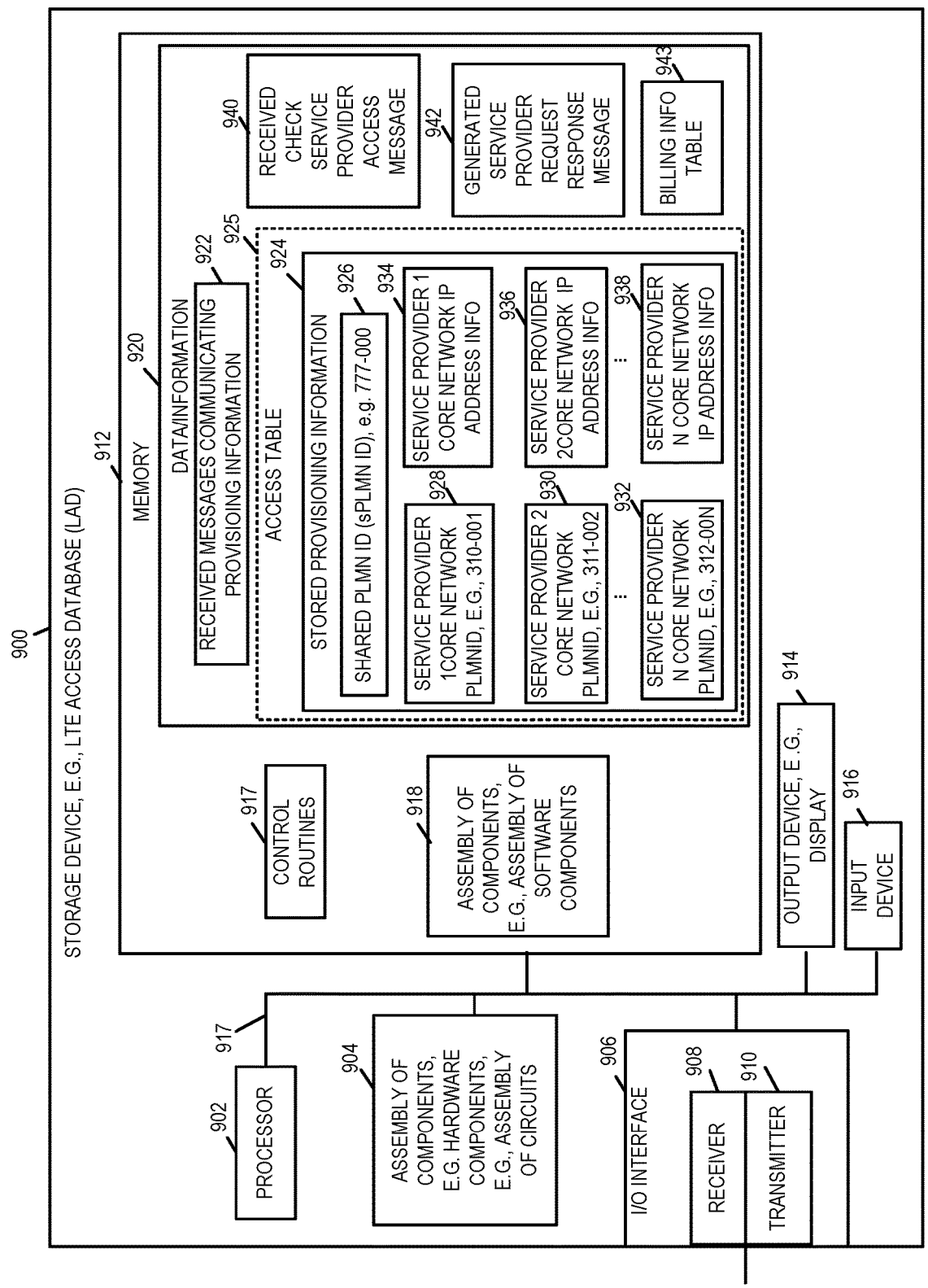
FIG. 9 is a drawing of an exemplary LTE access database (LAD) in accordance with an exemplary embodiment.

FIG. 9 is a drawing of an exemplary storage device, e.g., an LTE access database (LAD), 900 in accordance with an exemplary embodiment. LAD 900 is, e.g., LAD 112 of FIG. 1 and FIG. 2. LTE access database 900 includes a processor 902, e.g., a CPU, an assembly of components 904, e.g., an assembly of hardware components, e.g., assembly of circuits, an I/O interface 906, memory 912, an output device 914, e.g., a display, and an input device 916, e.g., a keyboard, mouse, etc., coupled together via a bus 917 via which the various components (902, 904, 906, 912, 914, 916) may exchange data and information. I/O interface 906 includes a receiver 908 and a transmitter 910, via which the LTE access database 900 may receive signals and send signals, e.g., from/to other devices, e.g., an LTE access gateway, a device in a service provider core network, etc. Memory 912 includes control routines 917 configured to control function and operation of the various interfaces and devices included in LAD 900, an assembly of components 918, e.g., an assembly of software components, and data/information 920. Data/information 920 includes received messages 922 communicating provisioning information 922, stored provisioning information 924, a received check service provider access message 940, a generated service provider request response message 942, and a billing information table 943. The stored provisioning information 924 includes a shared PLMN ID (sPLMN ID), e.g., 777-000, and information corresponding to a plurality of service provider core networks, which correspond to the shared PLMN ID 926. The information corresponding to the plurality of service provider core networks, which correspond to the shared PLMN ID 926, includes: service provider 1 core network information including a service provider 1 core network 1 PLMN ID 928, e.g., 310-001, and service provider 1 core network IP address information 924; service provider 2 core network information including a service provider 2 core network PLMN ID 930, e.g., 311-002, and service provider 2 core network IP address information 936; . . . ; service provider N core network information including a service provider N core network PLMN ID 932, e.g., 312-00N, where N is an integer value in the range of 0 . . . 9, and service provider N core network IP address information 938. In some embodiments the stored provisioning information 924 is included in an access table 925.

Figure 10:
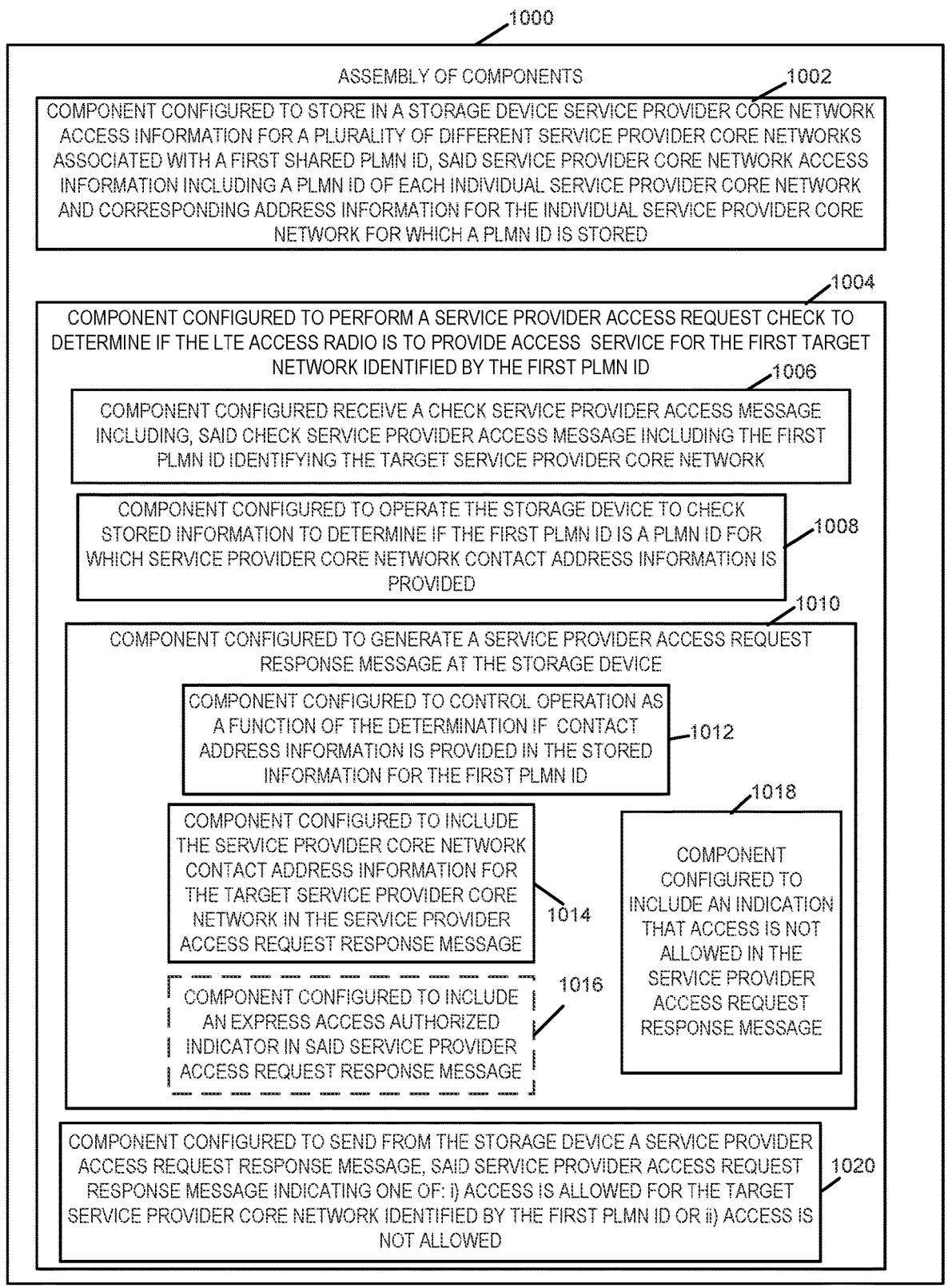
FIG. 10 is a drawing of an exemplary assembly of components, which may be included in a LTE access database (LAD) in accordance with an exemplary embodiment.

FIG. 10 is a drawing of an exemplary assembly of components 1000, which may be included in a LTE access database (LAD) 900 in accordance with an exemplary embodiment. Assembly of components 1000 can be, and in some embodiments is, used in LTE access database (LAD) 900 of FIG. 9. The components in the assembly of components 1000 can, and in some embodiments are, implemented fully in hardware within the processor 902, e.g., as individual circuits. The components in the assembly of components 1000 can, and in some embodiments are, implemented fully in hardware within the assembly of components 904, e.g., as individual circuits corresponding to the different components. In other embodiments some of the components are implemented, e.g., as circuits, within the processor 902 with other components being implemented, e.g., as circuits within assembly of components 904, external to and coupled to the processor 902. As should be appreciated the level of integration of components on the processor and/or with some components being external to the processor may be one of design choice. Alternatively, rather than being implemented as circuits, all or some of the components may be implemented in software and stored in the memory 912 of the LAD 900, with the components controlling operation of LAD 900 to implement the functions corresponding to the components when the components are executed by a processor, e.g., processor 902. In some such embodiments, the assembly of components 1000 is included in the memory 912 as assembly of components 918. In still other embodiments, various components in assembly of components 1000 are implemented as a combination of hardware and software, e.g., with another circuit external to the processor providing input to the processor 902 which then under software control operates to perform a portion of a component's function. While processor 902 is shown in the FIG. 9 embodiment as a single processor, e.g., computer, it should be appreciated that the processor 702 may be implemented as one or more processors, e.g., computers.

When implemented in software the components include code, which when executed by the processor 902, configure the processor 902 to implement the function corresponding to the component. In embodiments where the assembly of components 1000 is stored in the memory 912, the memory 912 is a computer program product comprising a computer readable medium comprising code, e.g., individual code for each component, for causing at least one computer, e.g., processor 902, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 8 control and/or configure the LTE access database 900 or elements therein such as the processor 902, to perform the functions of corresponding steps illustrated and/or described in the method of one or more of the flowcharts, signaling diagrams and/or described with respect to any of the Figures. Thus the assembly of components 1000 includes various components that perform functions of corresponding one or more described and/or illustrated steps of an exemplary method, e.g., steps of the method of signaling diagram 200 of FIG. 2 and/or steps of the method of flowchart 400 of FIG. 4.

Assembly of components 1000 includes a component 1002 configured to store in a stored device service provider core network access information for a plurality of different service provider core networks associated with a first shared PLMN ID, said service provider core network access information including a PLMN if each individual service provider core network and corresponding address information for the individual service provider core network for which a PLMN ID is stored, and a component configured to perform a service provider access request check to determine if the LTE access radio is to provide access service for the first target network identified by the first PLMN ID.

Component 1004 includes a component 1006 configured to receive a check service provider access message including the first PLMN ID identifying the target service provider core network a component 1008 configured to operate the storage device to check stored information to determine if the first PLMN ID is a PLMN ID for which service provider core network contact address information is provided, a component 1010 configured to generate a service provider access request response message at the storage device, and a component 1020 configured to send from the storage device, e.g., to a LTE access gateway, a service provider access request response message, said service provider access request response message indicating one of: i) access is allowed for the target service provider core network identified by the first PLMN ID or ii) access is not allowed.

Component 1010 includes a component 1012 configured to control operation as a function of the determination if contact address information is provided in the stored information for the first PLMN ID, a component 1014 configured to include the service provider core network contact address information for the target service provider core network in the service provider access request response message, e.g., in response to a determination that contact information is provided and that access is to be granted, and a component 1018 configured to include an indication that access is not allowed in the service provider access request response, e.g., in response to a determination that the first PLMN ID is not a PLMN ID for which service provider network contact address information is provided and that access is denied. In some embodiments, component 1010 further includes a component 1016 configured to include an express access authorized indicator in said service provider access request response message, e.g., when access is to be allowed.

Various aspects and/or features of some embodiments of the present invention are further described below. New service providers can build LNE system architecture based networks, in accordance with features and/or aspects of the present invention to extend the wireless services to other service providers that do not have coverage. These small service provider systems can complement each other's networks to provide services to their customers in the new areas.

The LTE network extension system is a new way of providing wireless services to the subscribers of affiliated LTE based wireless service providers. In some embodiments, an LTE network extension system is a third party solution, e.g., with a third party owning and/or controlling the LTE network extension system infrastructure, e.g., which is rented and/or leased out to one or more service providers. In some embodiments, an LTE network extension system is build and/or owned by one of the service providers and extended services are offered to other service providers, e.g., on a fee basis. The availability of LTE network extension systems will help wireless service providers to extend their network coverage and can also save cost of building new coverage areas.

Exemplary LTE network extension systems, in accordance with various features and/or aspects of the present invention, will overcome some the limitations with the current solutions to encourage the proliferation of small service providers that will be able to roam onto partner networks without complicated network set up.

Some of the benefits of LNE system(s), implemented in accordance with the present invention, include one or more of the following. An LTE Network extension system can, and sometimes does, extends LTE service without extensive roaming arrangement providing ease of provisioning and sign up. An LTE Network extension system overcomes the 6 network limit of MOCN architecture since number of supported partners is unlimited. Small network will be able to sign up to use these LNE networks and will encourage build of new wireless networks. An LNE system can be, and sometimes is, used to offload the macro network by large service providers in the hot spots, e.g., highly utilized areas e.g. venues, downtown, heavily populated areas. This will help large service providers to save cost of building network and also provide better user experience on LNE system which are expected to offer more capacity.

In some embodiments, an LNE system will broadcast a single PLMN (e.g. 777-000), sometimes referred to as a shared PLMN ID (sPLMN ID) using a set of LTE access radios (LAR). These radios (LAR) will be used to provide services to participating service provider's subscribers. Different LNE systems may, and sometimes do, correspond to different shared PLMN IDs.

A novel component of various exemplary LNE systems is the LTE Access Gateway (LAG). The LAG will control the access to LNE system and will act as a proxy between LAR and target service provider network. In some embodiments, the LAG will authenticate if the subscriber UE (user equipment) requesting access to wireless network is allowed to access services based on provisioned information in the LNE Access Database (LAD). In various embodiments, once the access is authorized, the LAG will act as a transparent bridge between LTE radios and target service provider's core network. In some embodiments, the LAG will act as a core to LAR and as a radio (LAR) towards service provider core network. In some embodiments, the LAD will maintain a list of participating (authorized) service providers and their network access information (e.g. IP routing).

The exemplary novel LNE system 102 architecture of LTE system 100 of FIG. 1 includes two new novel network elements called a LNE Access Gateway (LAG) 104 and a LNE Access Database (LAD) 112 in the LTE network architecture.

Exemplary new signaling messages, in accordance with some embodiments, include:
(i) a message from a Service provider to provision LAD for access, e.g., LAD provisioning signal message 218 of FIG. 2;
(ii) a message from the LAG to LAD to check if a service provider is provisioned, e.g., check service provider access message 245 from LAG 104 to LAD 112; and
(iii) a message from the LAD to the LAG to respond to LAG and notify the LAG if the service provider is provisioned along with data routing information to set up connectivity (service flow) if the service provider is provisioned, e.g., response message 254 from LAD 112 to LAG 104.

In various embodiments, a service provider provisions access to the LNE system via a message sent to the LAD. An exemplary Provision LTE network extension system for Access messages, in accordance with some embodiments, includes messages with the following features, information and/or characteristics:
    Message Type: SUBSCRIBE FOR ACCESS
        PLMN
        Evolved Packet Core Access Information
            IP Addresses
    Message Type: SUBSCRIBE FOR ACCESS ACKNOWLEDGEMENT
        Success An Exemplary LAG to LAD Check Servicer Provider Access Message, in accordance with some embodiments, includes the the following features, information and/or characteristics:
    Message Type: CHECK SERVICE PROVIDER ACCESS
        PLMN An exemplary LAD to LAG Service Provider Access Response Message, in accordance with some embodiments, includes the the following features, information and/or characteristics:
    Message Type: SERVICE PROVIDER ACCESS RESPONSE
        PLMN ALLOWED
            PLMN EPC Access Information
            IP addresses
    Message Type: SERVICE PROVIDER ACCESS RESPONSE
        PLMN NOT ALLOWED An exemplary LAG Database, e.g., LAD 112, structure, in accordance with some embodiments, will now be described. In various embodiments, the LAG database, e.g., LAD 112, includes access and billing related information, e.g., as shown below.

In some embodiments, an access table is provisioned to authenticate allowed PLMN and network access information for example IP addresses. In some embodiments, a billing table is used to maintain LNE System utilization by PLMN and subscriber ID along with session type, duration and amount of data exchanged during the session.

| Access | | |
|---|---|---|
| | PLMN | |
| | | IP Addresses |
| Billing | | |
| | PLMN | |
| | | Subscriber ID |
| | | Session Type |
| | | Session Duration |
| | | Data volume |

Numbered List of Exemplary Method Embodiments

Method Embodiment 1 A method of operating an LTE communications system (100), the method comprising: storing (221) in a storage device (LAD 112) service provider core network access information for a plurality of different service provider core networks associated with a first shared PLMN ID (sPLMN ID) (e.g., service provider core network access information for, in some embodiments more than 6, different service provider core networks may be stored, which may be used when an attach request is received including a first shared PLMN ID used to support providing of service to a plurality of different individual service provider core networks), said service provider core network access information including a PLMN ID of each individual service provider core network and corresponding address information (e.g., an IP address to be used to contact an individual service provider core network) for the individual service provider core network for which a PLMN ID is stored; operating an LTE access radio (204) to transmit (222), (e.g., in a broadcast message,) said first shared PLMN ID; and operating the LTE access radio (204) to receive (232) a first attach request (230) from a first user equipment (UE) device (202), (e.g., said first attach request having been transmitted by the first UE in response to the first UE receiving the first shared PLMN ID).

Method Embodiment 2 The method of Method Embodiment 1, further comprising: operating the LTE access radio (204) to forward (234) the first attach request to a LTE access gateway (104).

Method Embodiment 3 The method of Method Embodiment 2, further comprising: operating the LTE access gateway (104) to store (240) (e.g., in memory 712) the first attach request, said first attach request including a first IMSI of the first UE device (202) including a first PLMN ID of an individual service provider core network (206) used to provide network access to the first UE (202), said first PLMN ID being a PLMN ID of a first target network (206), said first target network being one of said plurality of different service provider core networks, said first PLMN ID being different from said shared PLMN ID; and perform (243) a service provider access request check (step 245 includes generating a check LAD message including the first PLMN ID extracted from the messages to the LAD) to determine if the LTE access radio (204) is to provide access service for the first target network identified by the first PLMN ID.

Method Embodiment 4 The method of Method Embodiment 3, wherein performing (243) a service provider access request check (245) includes: sending (244) a check service provider access message (245) to the storage device (LAD 112) including information on individual service provider core networks associated with the shared PLMN ID for which access service is to be provided, said check service provider access message (245) including the first PLMN ID identifying the target service provider core network; operating the storage device (LAD 112) to check (248) stored information to determine if the first PLMN ID is a PLMN ID for which service provider core network contact address information is provided (which will be the case if service is provisioned for the target service provider core network identified by the first PLMN ID); and sending (252) from the storage device (LAD 112) a service provider access request response message (254), said service provider access request access request response message (254) indicating one of: i) access is allowed for the target service provider core network identified by the first PLMN ID or ii) access is not allowed.

Method Embodiment 5 The method of Method Embodiment 4, further comprising: prior to sending (252) the service provider access request response message (254), generating (250) said service provider access request response message (254) at said storage device (112), said step of generating (250) said service provider access request response message (254) including: i) when contact address information is provided in the stored information for the first PLMN ID, including the service provider core network contact address information for the target service provider core network in said service provider access request response message (254) (in some embodiments the presence of such contact address information in the response message indicates that access is authorized; while in other embodiments an express access authorized indicator is included in the response message in addition to the access network contact address information); and ii) when contact address information is not provided in the stored information for the first PLMN ID (e.g., because the LAR is not a shared host for the target service provider network), including in said service provider access request response message (254) an indication that access is not allowed.

Method Embodiment 6 The method of Method Embodiment 5, further comprising: operating the LTE access gateway (104) to decide (259) whether or not to provide access for the first UE based on the content of the service provider access request response message (254).

Method Embodiment 7 The method of Method Embodiment 6, further comprising: when the decision (259) is to provide access for the first UE, operating (260) the LTE access gateway (104) to use IP network address information corresponding to the first target network, received in the access request response message (254) and stored information from the stored attach request that was received from the first UE (202) to generate (259*d*), at the LTE access gateway (104), a proxied attach request message (262) on behalf of the first UE (202); send (260) the proxied attach request message (262) to the service provider core network (206) corresponding to the first PLNM ID using an address obtained from the access request response message (254) as the destination address of the proxied attach request response message (262).

Method Embodiment 8 The method of Method Embodiment 7, further comprising: operating (266) the LTE access gateway to act as a proxy between the LTE access radio 204 and service provider core network (206) identified by the first PLMN ID for further exchange of control information and data on behalf of the first UE (202) as part of providing network access.

Method Embodiment 9 The method of Method Embodiment 8, wherein operating (266) the LTE access gateway to act as a proxy between the LTE access radio (204) and service provider core network (206) identified by the first PLMN ID includes: operating the LTE access gateway (104) to communicate an attach accept signal (272) and an end to end bearer established signal (276) between the service provider network (206) corresponding to the first PLMN ID and the first UE (202).

Method Embodiment 10 The method of Method Embodiment 7, further comprising: when the decision (259) is to not provide access for the first UE (202), operating (259*a*) the LTE access gateway (104) to send a message (259*b*) to the LTE access radio (204) to deny the UE (202) access in response to the first attach request message.

Numbered List of Exemplary System Embodiments

System Embodiment 1 An LTE communications system (100) comprising: a storage device (LAD 112) including memory (912) storing service provider core network access information for a plurality of different service provider core networks associated with a first shared PLMN ID (sPLMN ID) (e.g., service provider core network access information for more than 6 different service provider core networks, in some embodiments, may be stored, which may be used when an attach request is received including a first shared PLMN ID used to support providing of service to a plurality of different individual service provider core networks), said service provider core network access information including a PLMN ID of each individual service provider core network and corresponding address information (e.g., an IP address to be used to contact an individual service provider core network) for the individual service provider core network for which a PLMN ID is stored; an LTE access radio (204) including a first processor (502) configured to operate the LTE access radio (204) to transmit (222) said first shared PLMN ID; and operate the LTE access radio (204) to receive (232) a first attach request (230) from a first user equipment (UE) device (202).

System Embodiment 2 The LTE communications system (100) of System Embodiment 1, further comprising an LTE access gateway (104); and wherein said first processor (502) is further configured to: operate the LTE access radio (204) to forward (234) the first attach request to an LTE access gateway (104).

System Embodiment 3 The LTE communications system (100) of System Embodiment 12, wherein said LTE access gateway (104) includes a second processor (702), and wherein said second processor (702) is configured to: operate the LTE access gateway (104) to store (240) (e.g., in memory 712) the first attach request, said first attach request including a first IMSI of the first UE device (202) including a first PLMN ID of an individual service provider core network (206) used to provide network access to the first UE (202), said first PLMN ID being a PLMN ID of a first target network (206), said first target network being one of said plurality of different service provider core networks, said first PLMN ID being different from said shared PLMN ID; and operate LTE access gateway (104) to perform (243) a service provider access request check (step 245 includes generating a check LAD message including the first PLMN ID extracted from the messages to the LAD) to determine if the LTE access radio (204) is to provide access service for the first target network identified by the first PLMN ID.

System Embodiment 4 The LTE communications system (100) of System Embodiment 3, wherein said second processor (702) is configured to: send (244) a check service provider access message (245) to the storage device (LAD 112) including information on individual service provider core networks associated with the shared PLMN ID for which access service is to be provided, said check service provider access message (245) including the first PLMN ID identifying the target service provider core network, as part of being configured to perform a service provider access request check; and wherein said storage device (112) includes a third processor (902), and wherein said third processor (902) is configured to: operate the storage device (LAD 112) to check (248) stored information to determine if the first PLMN ID is a PLMN ID for which service provider core network contact address information is provided (which will be the case if service is provisioned for the target service provider core network identified by the first PLMN ID); and operate the storage device (LAD 112) to send (252) from the storage device (LAD 112), e.g., to the LTE access gateway, a service provider access request response message (254), said service provider access request access request response message (254) indicating one of: i) access is allowed for the target service provider core network identified by the first PLMN ID or ii) access is not allowed.

System Embodiment 5 The LTE communications system (100) of System Embodiment 14, wherein said third processor (902) is further configured to: generate (250) said service provider access request response message (254) at said storage device (112) prior to sending (252) the service provider access request response message (254), said step of generating (250) said service provider access request response message (254) including: i) when contact address information is provided in the stored information for the first PLMN ID, including the service provider core network contact address information for the target service provider core network in said service provider access request response message (254) (in some embodiments the presence of such contact address information in the response message indicates that access is authorized; while in other embodiments an express access authorized indicator is included in the response message in addition to the access network contact address information); and ii) when contact address information is not provided in the stored information for the first PLMN ID (e.g., because the LAR is not a shared host for the target service provider network), including in said service provider access request response message (254) an indication that access is not allowed.

System Embodiment 6 The LTE communications system (100) of System Embodiment 5, wherein said second processor (702) is further configured to operate the LTE access gateway (104) to decide (259) whether or not to provide access for the first UE based on the content of the service provider access request response message (254).

System Embodiment 7 The LTE communications system (100) of System Embodiment 6, wherein said second processor (702) is further configured to: operate (260) the LTE access gateway (104) to use IP network address information corresponding to the first target network, received in the access request response message (254) and stored information from the stored attach request that was received from the first UE (202) to generate (259d), at the LTE access gateway (104), a proxied attach request message (262) on behalf of the first UE (202), when the decision (259) is to provide access for the first UE; and operate the LTE gateway device (104) to send (260) the proxied attach request message (262) to the service provider core network (206) corresponding to the first PLNM ID using an address obtained from the access request response message (254) as the destination address of the proxied attach request response message (262), when the decision (259) is to provide access for the first UE.

System Embodiment 8 The LTE communications system of System Embodiment 7, wherein said second processor (702) is further configured to: operate (266) the LTE access gateway (104) to act as a proxy between the LTE access radio (204) and service provider core network (206) identified by the first PLMN ID for further exchange of control information and data on behalf of the first UE (202) as part of providing network access.

System Embodiment 9 The LTE communications system (100) of System Embodiment 8, wherein said second processor (702) is further configured to: operate the LTE access gateway (104) to communicate an attach accept signal (272) and an end to end bearer established signal (276) between the service provider network (206) corresponding to the first PLMN ID and the first UE (202), as part of being configured to operate (266) the LTE access gateway to act as a proxy between the LTE access radio (204) and service provider core network (206) identified by the first PLMN ID.

System Embodiment 10 The LTE communications system (100) of System Embodiment 7, wherein said second processor (702) is further configured to: operate (259a) the LTE access gateway (104) to send a message (259b) to the LTE access radio (204) to deny the UE (202) access in response to the first attach request message, when the decision (259) is to not provide access for the first UE (202).

System Embodiment 11 The LTE communications system (100) of System Embodiment 2, wherein said LTE access radio (204), said LTE access gateway (104) and said storage device (LAD 112) are part of an LTE network extension (LNE) system (102).

System Embodiment 12 The LTE communications system (100) of System Embodiment 11, wherein said LTE access radio (204) is one of at least 7 LTE access radios (LAR 1 106, LAR 2 108, . . . . LAR M110, where M is greater than or equal to 7) in the LTE network extension system (102) which broadcast the same shared PLMN ID (e.g., 777-000).

System Embodiment 13 The LTE communications system (100) of System Embodiment 12, wherein said plurality of different service provider core networks associated with a first shared PLMN ID includes at least 7 different service provider core networks.

Numbered List of Exemplary Computer Readable Medium Embodiments

Computer Readable medium Embodiment 1. A non-transitory computer readable medium including computer executable instructions which when executed by one or more processors of a LTE communications system cause the LTE ommunications system to perform the steps of: storing (221) in a storage device (LAD 112) service provider core network access information for a plurality of different service provider core networks associated with a first shared PLMN ID (sPLMN ID) (e.g., service provider core network access information for more than 6 different service provider core networks, in some embodiments, may be stored, which may be used when an attach request is received including a first shared PLMN ID used to support providing of service to a plurality of different individual service provider core networks), said service provider core network access information including a PLMN ID of each individual service provider core network and corresponding address information (e.g., an IP address to be used to contact an individual service provider core network) for the individual service provider core network for which a PLMN ID is stored; operating an LTE access radio (204) to transmit (222) said first shared PLMN ID; and operating the LTE access radio (204) to receive (232) a first attach request (230) from a first user equipment (UE) device (202).

The techniques of various embodiments may be implemented using software, hardware and/or a combination of software and hardware. Various embodiments are directed to apparatus and/or systems, a wireless cellular LTE communications system, e.g., a 3GPP cellular system including LTE/NR wireless access components and using fiber for at least a portion of the backhaul, an LTE network extension system, service provider core networks, core network components, a data network, access points, e.g., 3GPP LT/NR access points, e.g., an LTE access radio, a LTE access gateway, a LTE access database, networks, a 4G LTE system, a 5G LTE system, etc. Various embodiments are also directed to methods, e.g., method of controlling and/or operating a system or device, e.g., a communications system, a LTE network extension system, a hybrid system, e.g., a hybrid cable/LTE system, etc. Various embodiments are also directed to machine, e.g., computer, readable medium, e.g., ROM, RAM, CDs, hard discs, etc., which include machine readable instructions for controlling a machine to implement one or more steps of a method. The computer readable medium is, e.g., non-transitory computer readable medium.

It is understood that the specific order or hierarchy of steps in the processes and methods disclosed is an example of exemplary approaches. Based upon design preferences, it is understood that the specific order or hierarchy of steps in the processes and methods may be rearranged while remaining within the scope of the present disclosure. The accompanying method claims present elements of the various steps in a sample order, and are not meant to be limited to the specific order or hierarchy presented. In some embodiments, one or more processors are used to carry out one or more steps of the each of the described methods.

In various embodiments each of the steps or elements of a method are implemented using one or more processors. In some embodiments, each of elements are steps are implemented using hardware circuitry.

In various embodiments nodes and/or elements described herein are implemented using one or more components to perform the steps corresponding to one or more methods, for example, performing authentication, identifying, generating a message, message reception, signal processing, sending, communicating, e.g., receiving and transmitting, comparing, negotiating, making a decision, determining and/or transmission steps. Thus, in some embodiments various features are implemented using components or in some embodiments logic such as for example logic circuits. Such components may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium, e.g., a non-transitory computer readable medium, including machine executable instructions for causing a machine, e.g., processor and associated hardware, to perform one or more of the steps of the above-described method(s). Some embodiments are directed to a device, e.g., user device such as a UE, a LTE access radio, a LTE access gateway, an LTE access database, a core device, a server, a communication node, etc., including a processor configured to implement one, multiple or all of the steps of one or more methods of the invention.

In some embodiments, the processor or processors, e.g., CPUs, of one or more devices, are configured to perform the steps of the methods described as being performed by the devices, e.g., communication nodes. The configuration of the processor may be achieved by using one or more components, e.g., software components, to control processor configuration and/or by including hardware in the processor, e.g., hardware components, to perform the recited steps and/or control processor configuration. Accordingly, some but not all embodiments are directed to a device, e.g., communications node such as a UE, LTE access radio, LTE access gateway, LTE access database, with a processor which includes a component corresponding to each of the steps of the various described methods performed by the device in which the processor is included. In some but not all embodiments a device, e.g., communications node such as a LTE access radio, LTE access gateway, LTE access database, UE, service provider core node, includes a component corresponding to each of the steps of the various described methods performed by the device in which the processor is included. The components may be implemented using software and/or hardware.

Some embodiments are directed to a computer program product comprising a computer-readable medium, e.g., a non-transitory computer-readable medium, comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of controlling a controller or node. The code may be in the form of machine, e.g., computer, executable instructions stored on a computer-readable medium, e.g., a non-transitory computer-readable medium, such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device such as a controller or other device described in the present application.

Numerous additional variations on the methods and apparatus of the various embodiments described above will be apparent to those skilled in the art in view of the above description. Such variations are to be considered within the scope. Numerous additional embodiments, within the scope of the present invention, will be apparent to those of ordinary skill in the art in view of the above description and the claims which follow. Such variations are to be considered within the scope of the invention.

What is claimed is:

1. A method of operating a communications system, the method comprising:
    operating a network device to receive an attach request message corresponding to a user equipment (UE) which received a shared network identifier (ID) corresponding to a plurality of service provider networks identified by different network IDs, said attach request message including a first network identifier of a service provider network which provides service to said UE, said first network identifier being one of the different network IDs corresponding to said shared network ID;
    operating the network device to determine from stored information a network address corresponding to said first network ID; and
    operating the network device to use the network address corresponding to the first network ID and information from the attach request message to generate a proxied attach request message on behalf of the UE; and
    operating the network device to send the proxied attach request message to the service provider network corresponding to the first network ID using the determined network address.

2. The method of claim 1, wherein said network device is an access gateway.

3. The method of claim 2, further comprising:
    operating the access gateway to act as a proxy between an access radio in communication with the UE and the service provider network corresponding to the first network ID for exchange of control information and communication of data between the UE and the service provider network corresponding to the first network ID.

4. The method of claim 3, wherein operating the access gateway to act as a proxy between an access radio in communication with the UE and the service provider network corresponding to the first network ID includes:
    communicating an accept signal from the service provider network corresponding to the first network ID to the UE via the access radio.

5. The method of claim 4, wherein operating the access gateway to act as a proxy between an access radio in communication with the UE and the service provider network corresponding to the first network ID further includes:
    establishing end to end connectivity between the UE and the service provider network corresponding to the first network ID.

6. The method of claim 5, wherein operating the access gateway to act as a proxy between an access radio in communication with the UE and the service provider network corresponding to the first network ID further includes:
    supporting service provider core interaction signaling between the UE and service provider network corresponding to the first network ID.

7. A non-transitory computer readable medium including computer executable instructions which when executed by one or more processors of a communications system cause the communications system to perform the steps of:
    operating a network device to receive an attach request message corresponding to a user equipment (UE) which received a shared network identifier (ID) corresponding to a plurality of service provider networks identified by different network IDs, said attach request message including a first network identifier of a service provider network which provides service to said UE, said first network identifier being one of the different network IDs corresponding to said shared network ID;
    operating the network device to determine from stored information a network address corresponding to said first network ID; and
    operating the network device to: use the network address corresponding to the first network ID and information from the attach request message to generate a proxied attach request message on behalf of the UE; and
    operating the network device to send the proxied attach request message to the service provider network corresponding to the first network ID using the determined network address.

8. The non-transitory computer readable medium of claim 7, wherein said network device is an access gateway.

9. The non-transitory computer readable medium of claim 8, further including computer executable instructions which when executed by one or more processors of the communications system cause the communications system to perform the steps of:
    operating the access gateway as a proxy between an access radio in communication with the UE and the service provider network corresponding to the first network ID for exchange of control information and communication of data between the UE and the service provider network corresponding to the first network ID.

10. The non-transitory computer readable medium of claim 9, wherein operating the access gateway as a proxy between an access radio in communication with the UE and the service provider network corresponding to the first network ID includes:
    communicating an accept signal from the service provider network corresponding to the first network ID to the UE via the access radio.

11. The non-transitory computer readable medium of claim 10, wherein operating the access gateway as a proxy between an access radio in communication with the UE and the service provider network corresponding to the first network ID further includes:

establishing end to end connectivity between the UE and the service provider network corresponding to the first network ID.

12. The non-transitory computer readable medium of claim 11, wherein operating the access gateway as a proxy between an access radio in communication with the UE and the service provider network corresponding to the first network ID further includes:

supporting service provider core interaction signaling between the UE and service provider network corresponding to the first network ID.

13. A network device comprising:

a memory for storing information; and a processor coupled to said memory, said processor being configured to control the network device to perform the steps of:

receiving an attach request message corresponding to a user equipment (UE) which received a shared network identifier (ID) corresponding to a plurality of service provider networks identified by different network IDs, said attach request message including a first network identifier of a service provider network which provides service to said UE, said first network identifier being one of the different network IDs corresponding to said shared network ID;

determining from stored information a network address corresponding to said first network ID; and generating a proxied attach request message on behalf of the UE from the network address corresponding to the first network ID and information from the attach request message; and sending the proxied attach request message to the service provider network corresponding to the first network ID using the determined network address.

14. The network device of claim 13, wherein said network device is an access gateway.

15. The network device of claim 14, wherein the processor is further configured to control the network device to:

operate as a proxy between an access radio in communication with the UE and the service provider network corresponding to the first network ID for exchange of control information and communication of data between the UE and the service provider network corresponding to the first network ID.

16. The network device of claim 15, wherein the processor is configured to control the network device to perform the following step as part of operating as a proxy between an access radio in communication with the UE and the service provider network:

communicate an accept signal from the service provider network corresponding to the first network ID to the UE via the access radio.

17. The network device of claim 16, wherein the processor is further configured to control the network device to perform the following step as part of operating as a proxy between an access radio in communication with the UE and the service provider network:

establish end to end connectivity between the UE and the service provider network corresponding to the first network ID.

18. The network device of claim 17, wherein the processor is further configured to control the network device to perform the following step as part of operating as a proxy between an access radio in communication with the UE and the service provider network:

support service provider core interaction signaling between the UE and service provider network corresponding to the first network ID.

\* \* \* \* \*